United States Patent [19]
English et al.

[11] 3,857,025
[45] Dec. 24, 1974

[54] NUMERICALLY CONTROLLED ENGRAVING MACHINE SYSTEM

[75] Inventors: Myrle H. English, West Chester, Pa.; Laurence Goodstal, Ilion, N.Y.; Wayne E. Leek, Mohawk, N.Y.; Robert J. Sanzo, Ilion, N.Y.; Robert L. Turner, Newark, Del.; Clark B. Workman, Mohawk, N.Y.; Edward W. Yetter, West Chester, Pa.

[73] Assignee: Remington Arms Company, Inc., Bridgeport, Conn.

[22] Filed: May 7, 1971

[21] Appl. No.: 141,136

[52] U.S. Cl............... 235/151.11, 90/13 C, 444/1, 318/568, 33/23 R
[51] Int. Cl........................ G05b 19/42, B23c 1/16
[58] Field of Search.............. 235/151.11, 152 IE; 33/1 M, 22; 90/13 C

[56] References Cited
UNITED STATES PATENTS

| | | | |
|---|---|---|---|
| 2,565,914 | 8/1951 | Dies | 33/22 |
| 3,127,506 | 11/1955 | Fayard | 235/152 IE |
| 3,559,021 | 2/1967 | Bingham, Jr. | 235/151.11 X |
| 3,573,737 | 4/1971 | Rosenberg | 235/151.11 X |
| 3,609,319 | 9/1971 | Clifford, Jr. et al. | 235/151.11 |
| 3,628,417 | 12/1971 | Graboyes | 90/13 C |
| 3,665,608 | 5/1972 | Stockebrand | 33/1 M |
| 3,746,845 | 7/1973 | Henegar et al. | 235/151.11 |

OTHER PUBLICATIONS
"Production-proved Numerical Control" by Ankeney et al., American Machinist, Nov. 4, 1957, p.p. 145–156.

Primary Examiner—Eugene G. Botz

[57] ABSTRACT

A system for automatic simulation by computerized machinery of a hand-engraved pattern in a workpiece. The present system, while concerned primarily in the simulation of engraving patterns by a machine process, nonetheless is applicable to the generation or regeneration of a variety of intricate patterns. In such respect, the process may be useful in copying decorative patterns for printed cards, reproducing of contour maps, and a myriad of other purposes involving the simulation of contours or of a pattern of lines existing in multi-dimensional space.

The invention introduces several novel aspects to the art of computerized machinery, and particularly to numerically controlled machinery having multi-axis operation, with one of the major objectives being a reduction of volume of control tape and operation time. The present system usually involves two computers: (1) a digital computer for generating a control tape numerically representative of the pattern to be reproduced; and (2) a digital control computer for controlling a multi-axis machine to regenerate the pattern stored on the control tape.

28 Claims, 30 Drawing Figures

Inventors:
Myrle H. English
Laurence Goodstal
Wayne E. Leek
Robert J. Sanzo
Robert L. Turner
Clark B. Workman
Edward W. Yetter by Attorneys

PATENTED DEC 24 1974

Inventors:
Myrle H. English
Laurence Goodstal
Wayne E. Leek
Robert J. Sanzo
Robert L. Turner
Clark B. Workman
Edward W. Yetter
by John H. Lewis Jr.
Nicholas Skovran
Robert S. Salzman
Attorneys

Inventors:
Myrle H. English
Laurence Goodstal
Wayne E. Leek
Robert J. Sanzo
Robert L. Turner
Clark B. Workman
Edward W. Yetter by Attorneys Inventors:
Myrle H. English
Laurence Goodstal
Wayne E. Leek
Robert J. Sanzo
Robert L. Turner
Clark B. Workman
Edward W. Yetter by John H. Lewis Jr.
Nicholas S. ....
Robert S. Salzman Attorneys Inventors:
Myrle H. English
Laurence Goodstal
Wayne E. Leek
Robert J. Sanzo
Robert L. Turner
Clark B. Workman
Edward W. Yetter by Attorneys Fig. 8.
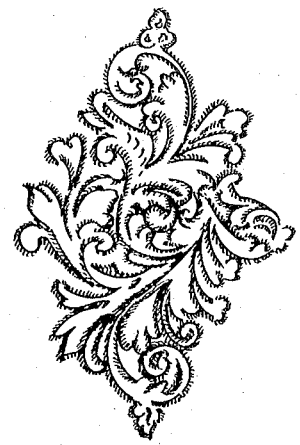
Fig. 9.
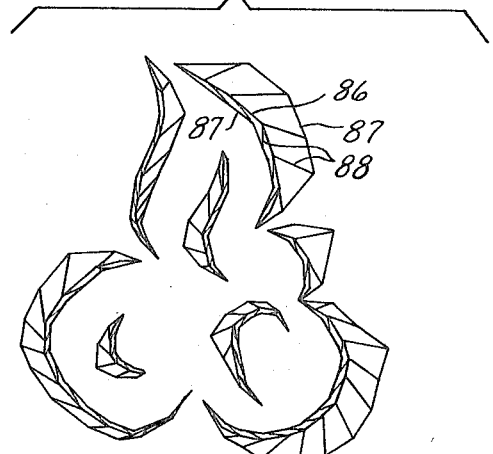
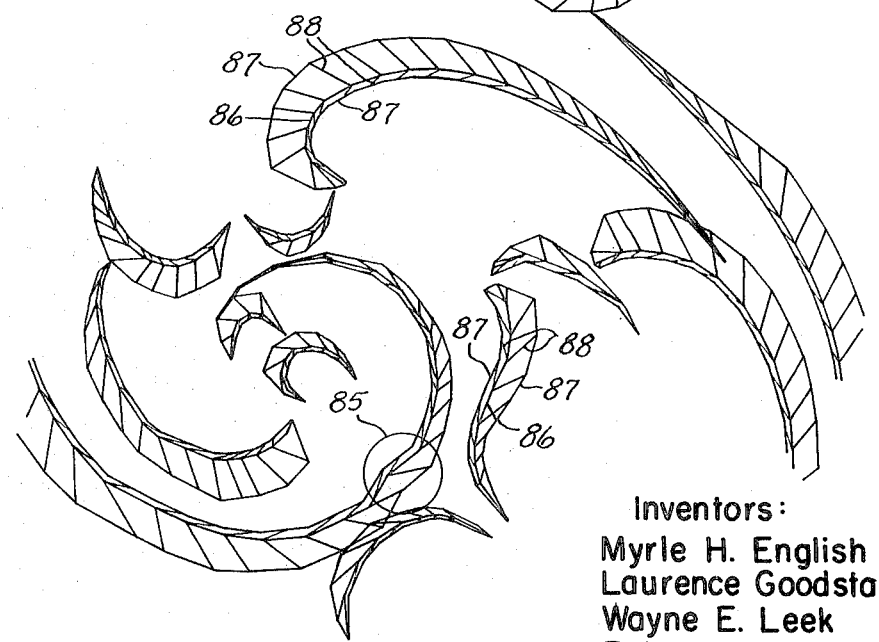
Fig. 10.
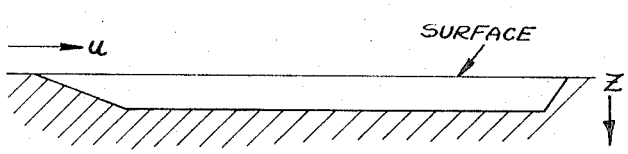
Fig. 10a.
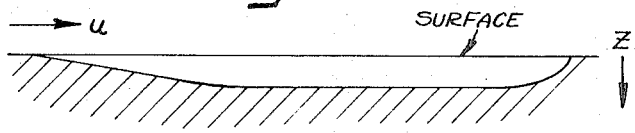
Inventors:
Myrle H. English
Laurence Goodstal
Wayne E. Leek
Robert J. Sanzo
Robert L. Turner
Clark B. Workman
Edward W. Yetter
by
Attorneys Inventors:
Myrle H. English
Laurence Goodstal
Wayne E. Leek
Robert J. Sanzo
Robert L. Turner
Clark B. Workman
Edward W. Yetter by Attorneys

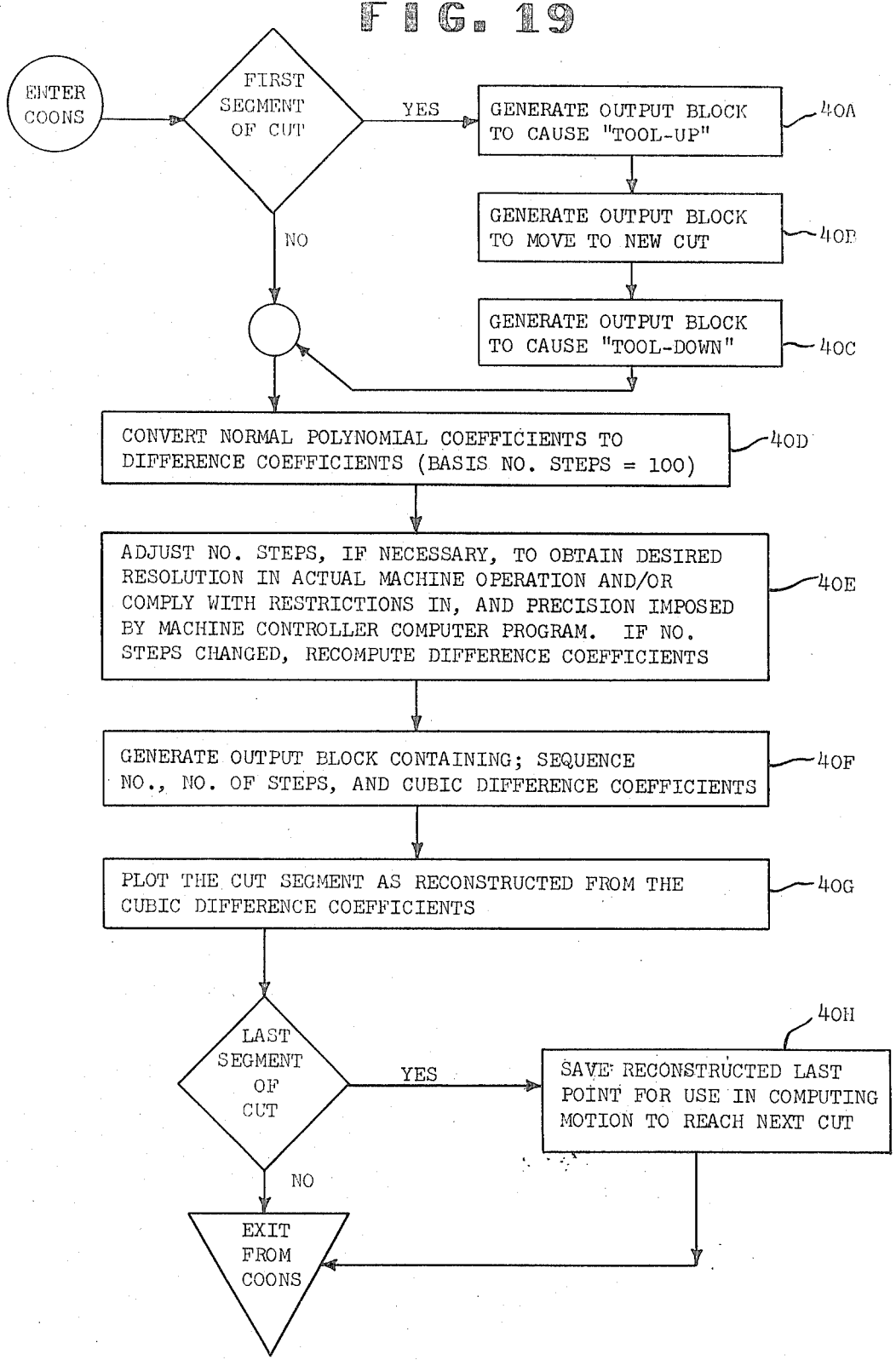

NUMERICALLY CONTROLLED ENGRAVING MACHINE SYSTEM

The present invention pertains to simulating by computerized machinery a hand-engraved pattern in a workpiece, which is visually and aesthetically comparable to the original design.

In the past, the production of engraved designs on hard and tough metals such as steel could only be accomplished by hand, requiring highly skilled artisans. Unfortunately, modern times have seen the erosion of many specialized techniques such as engraving, which requires highly skilled personnel.

The scarcity and high cost of experienced people has made engraving on steel prohibitive in all except a few applications, such as, printing plates for bank notes and high-priced firearms.

As a result of this trend, substitute methods were sought to simulate the engraver's art. Embossing by rolls or stamps, and metal removal techniques employing conical end-mills or routers were tried. These methods were only nominally successful, because the visual effects of the engraving cut could not be duplicated by any other tool except that used by the engraver. In other words, the pleasing pattern of hand-engraving depends upon the detail geometry and the surface finish of the cut.

Finally, thought was given towards using machinery with the same tools and metal removal techniques as those used in hand-engraving. It was realized that the complexities of each cut in the pattern could be handled by computer-controlled methods. In addition, computerized methods were required not only to overcome the complexity of the operation, but equally to speed up the process and thereby reduce costs.

The adoption of computer techniques to regenerate an engraving pattern, however, was no small task. To begin with, the various motions of the engraver's tool in making each cut had to be carefully scrutinized. Then, in order that a machine could guide a machine tool to duplicate the hand-held tool motions, these motions had to be defined and expressed in mathematical terms. Equations were derived to define the coordinates of the various tool motions. The coefficients for each equation were derived for each cut or cut segment by means of a digital computer.

To regenerate an entire pattern, a tape is generated by the computer with all the numerical indicia necessary to reproduce every cut sequentially. This tape is fed to a digital control computer whose output controls a machine guiding the relative motion of the engraving tool with respect to the workpiece.

One of the novelties of this invention is its mathematical approach to the engraving problem. A new mathematical concept developed by Professor Steven A. Coons, of the Massachusetts Institute of Technology, (Electronic Systems Laboratory - Memorandum MAC-M-253), was useful in the solution to engraving simulation. Professor Coons demonstrated that contours can be expressed in terms of third degree or higher ordered polynomials, each having a common parameter.

The motion of a hand-held engraving tool making a cut in a workpiece was analyzed and then broken down into component motions expressed as mathematical variables. A polynomial equation was written for each variable, and the coefficients for each polynomial were derived. The coefficients were expressed as difference coefficients so that their generation or regeneration requires only an addition operation rapidly implemented on a small computer.

The variables describing the tool motion relate to the tool angle in rotation and tilt, the depth of cut in the workpiece taken by the tool, and the coordinates which define the path of the tool in making the cut.

Having established a computer system for converting tool motions into numerical indicia and then regenerating these motions by means of a control computer, it is possible to reproduce any design or pattern whose lines exist in multi-dimensional space. The visual characteristics of the machining or marking process will depend upon the nature of the tool used. In other words, a printed design or emblem may be reproduced by means of a pen or marking-type element. Likewise, the reproduction of intricate surface contours may require the use of a routing-type element. As long as any particular tool motion can be analyzed, the present computer system can be used to reproduce the design.

It is an object of this invention to provide a computerized system for generating a line course existing in multi-dimensional space.

It is another object of this invention to provide a computerized system for regenerating a line course existing in multi-dimensional space.

It is yet another object of this invention to provide a computerized engraving system capable of simulating engraving patterns of high visual and aesthetic quality.

It is still another object of this invention to reduce the amount of stored information required to generate or regenerate a pattern of lines existing in multi-dimensional a space.

These and other objects of this invention will be better understood and will become more apparent with reference to the detailed description and drawings in which:

FIG. 3b is a side view of the engraving chisel making the cut of FIG. 3a;

FIGS. 3c through 3e are views showing the geometry of the cut and the engraving chisel of FIG. 3a, wherein:

FIG. 3c shows a plan view of a section of the cut;

FIG. 3d is a cross-sectional view of the chisel face and the workpiece; and

FIG. 3e shows an isometric view of the chisel making a cut in the workpiece;

FIG. 8 is a full scale view of an engraving pattern plotted by the digital computer plotting table;

FIG. 9 is a view of a portion of the plot of FIG. 8 shown at 10 times scale;

FIG. 10 is a developed longitudinal sectional view of a typical border cut;

FIG. 10a is a developed longitudinal sectional view of a typical scroll cut;

FIGS. 17-19 are flow charts of the master computer program for determining and storing coefficients of continuous polynomial functions defining line courses existing in multidimensional space.

Figure 1:
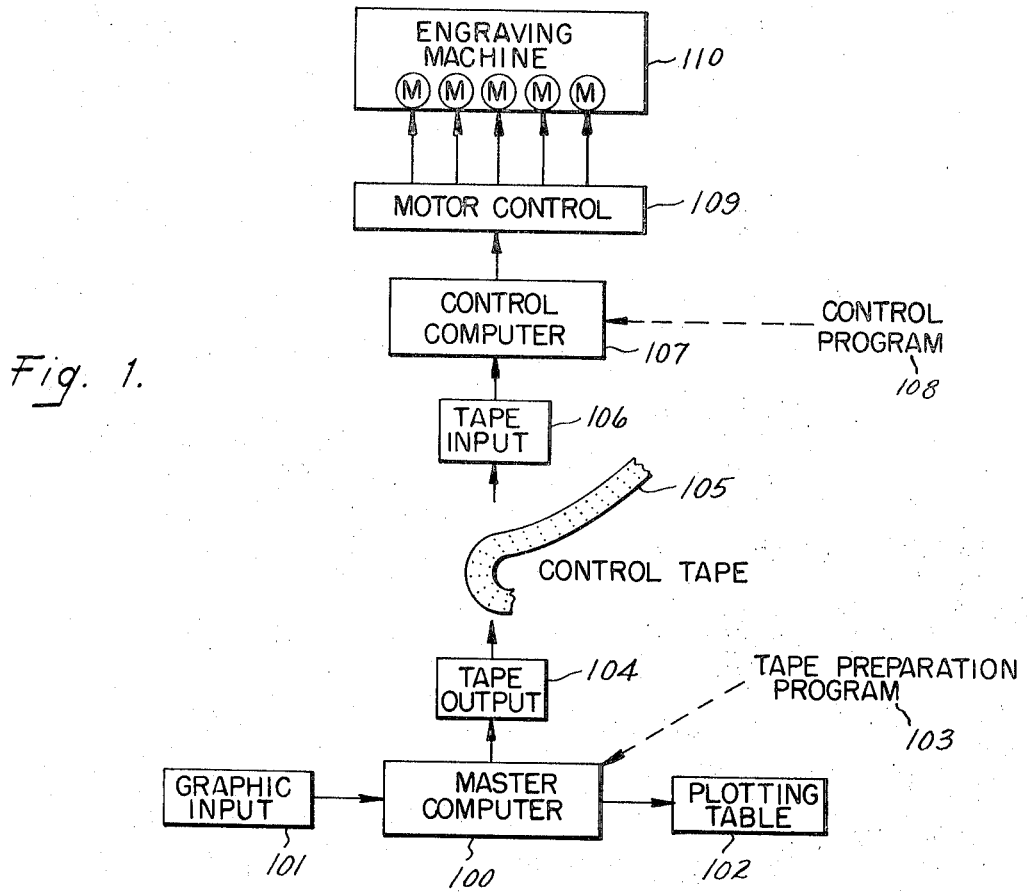
FIG. 1 is a schematic diagram of the complete computerized engraving system.

Broadly speaking, the invention contemplates the method of generating or regenerating a line course existing in multi-dimensional space.

In generating a line course existing in multidimensional space, a plurality of continuous polynomial functions having a common parameter are selected. The functions so selected are descriptive of the respective coordinates defining the line course. A digital computer is utilized to determine the coefficients for each of the polynomial functions.

Next, the coefficients are stored.

Then, the coordinates defining said line course are respectively generated as successive sequential increments from said stored coefficients.

A preselected line course is similarly regenerated by selecting the polynomials to fit the particular line course.

More specifically, the regeneration of said line course is for one of a pattern of lines existing in multidimensional space, and is regenerated by a double computer operation as follows:

A digital computer input is prepared which is an expression of the preselected line of said pattern. Next, a digital computer is utilized to determine the coefficients of the previously mentioned polynomials. A control type including said coefficients is prepared by the computer.

A digital control computer is fed the control tape. The control computer is programmed to be responsive to the coefficients so as to direct the motions of a plurality of axis motors. A machine having a regenerating element controlled by said axis motors is caused to regenerate the line course.

As applies explicitly to the simulation of a preselected hand-engraved pattern in a workpiece, the method of regeneration is the expression of an engraved pattern in terms of numerical indicia. These indicia are fed to the digital control computer which is programmed to control the axis motors of a machine having a power driven reciprocating engraving tool. The axis motors control the powered engraving tool simulative of the motions of a hand-held tool about a workpiece.

The motion of a hand-held engraving tool making a cut in a workpiece may be translated into numerical indicia by defining a tool's overall motion as a plurality of component motions.

For an engraving cut in a flat workpiece, the component motions are expressed as independent variables: X, Y, Z and $\alpha$, and a dependent variable $\theta$, where:

X is the lateral motion of the tool substantially parallel to the face plane of the workpiece;

Y is the motion of the tool perpendicular to X and substantially parallel to the face plane of the workpiece:

Z is the depth motion of the tool substantially perpendicular to the face plane of the workpiece; $\alpha$ is the tilting motion of the tool about an axis passing through the cutting tip of the tool and substantially parallel to the face plane of the workpiece; and $\theta$ is the rotational motion of the tool about an axis passing through the cutting tip of the tool and substantially perpendicular to the face plane of the workpiece, and further wherein $\theta$ is the heading of the tool defined as the angle of the tangent to the tool path at the cutting tip of the tool.

For an engraving cut in a cylindrically-shaped surface of a workpiece, whose cylindrical surface is created by a generating element, the component motions are expressed as independent variables: X, $Y_r$, Z and $\alpha$, and a dependent variable $\theta$, where:

X is the lateral motion of the tool substantially parallel to the generating element of said surface;

$Y_r$ is the motion of the tool substantially parallel to the plane tangent to the curved surface of the workpiece at the cutting tip of the tool, and substantially perpendicular to the generating element of said surface;

Z is the depth of the tool substantially perpendicular to the plane tangent to the curved surface of the workpiece at the cutting tip of the tool;

$\alpha$ is the tilting motion of the tool about an axis passing through the cutting tip of the tool and substantially parallel to the plane tangent to the curved surface of the workpiece at the cutting tip of the tool; and $\theta$ is the rotational motion of the tool about an axis passing through the cutting tip of the tool and substantially perpendicular to the plane tangent to the curved surface of the workpiece at the cutting tip of the tool, and further wherein $\theta$ is the heading of the tool defined as the angle of the tangent to the tool path at the cutting tip of the tool.

The variables are introduced to the digital computer as coded data.

The X and Y data points along the cut are utilized to develop the string length "$u$" according to the following formula:

$$u_n = \sum_{i}^{n} \sqrt{\Delta X_i^2 + \Delta Y_i^2}$$

where:

$\Delta X_i = X_i - X_{i-1}$
$\Delta Y_i = Y_i - Y_{i-1}$

Next, the computer is programmed to generate the dependent variable "$\theta$" which represents the tool heading in accordance with a formula of the type:

$$\theta_n = \arc\tan Y_{n+1} - Y_{n-1}/X_{n+1} - X_{n-1}$$

As was aforementioned, the variables are then expressed as a plurality of continuous polynomials having a common parameter.

In our case, we chose the string length $u$ as the common parameter for the variables:

$X = f_x(u)$
$Y = f_y(u)$
$Z = f_z(u)$
$\alpha = f_\alpha(u)$
$\theta = f(u)$

Thus, the polynomials are expressed as:
$X = a + bu + cu^2 + du^3 + \ldots$
$Y = e + fu + gu^2 + hu^3 + \ldots$
$Z = i + ju + ku^2 + lu^3 + \ldots$
$\theta = m + nu + pu^2 + qu^3 + \ldots$
$\alpha = r + su + tu^2 + vu^3 + \ldots$;

The computer derives the coefficients of the polynomials and stores them for input into the control computer.

Professor Coons has specified that third degree or higher polynomials are adequate to define any contour.

Actually, the degree selected is a matter of choice, and depends upon the economics of operation. In other words, the amount of tape generated will be dependent upon the degree selected for the polynomials defining each cut. While a higher degree polynomial requires more coefficients, this set of coefficients may be adequate to produce a longer cut, and thus, may actually reduce the overall number of coefficients required to produce a complete pattern.

In our case, it is convenient to select third degree polynomials as they are usually adequate to regenerate any line course existing in multi-dimensional space, except for straight line motions.

The computer is programmed to generate a polynomial of predetermined degree for each variable. If the variable X along a segment of the curve is a straight line, a first degree of polynomial would be adequate. Then too, for straight motions of the tool not involving cutting, i.e., where the tool is moving from one cut to another cut, or up or down at the beginning or end of each cut, a first degree polynomial is also sufficient.

In general a polynomial cannot duplicate exactly an arbitrary curve as defined by a series of points. In our case exact duplication is not necessary and the generated line is allowed to deviate by a predetermined tolerance. Thus, in comparing the generated polynomials with the data points, the computer will subdivide the cut into segments dependent upon the allowable departure tolerance. Thus, several segments may be required to regenerate any particular cut on the control computer.

It should be noted, in engraving, the determination of tolerance limits and the resultant degree of subdivision of cuts depends on aesthetic considerations such as the desirability of producing long sweeping curves rather than blindly reproducing the data points.

The coefficients obtained in determining the polynomials are stored on the control tape with data referring to the number of increments needed for regeneration of the cut, and the degree of polynomial for all axes. These data are then fed to the control computer which is programmed in accordance with the following flow chart:

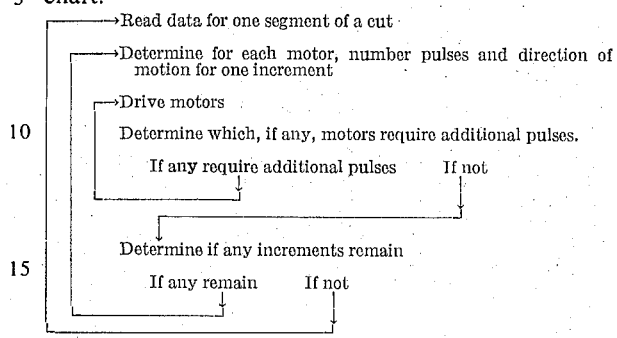

The above continues until all data are exhausted.

The output of the control computer controls a plurality of axis motors. Each axis motor in turn controls the relative motion of the engraving tool about the workpiece for that particular axis variable. The engraving tool is powered by an air-hammer as a substitute for the periodic hand-induced hammer blows.

Now referring to FIG. 1, a block diagram is shown for the complete computerized engraving system. The master computer 100 may be a medium or large-sized digital computer having a tape output 104 and an input 101 in which the data may be introduced graphically, manually, or by other means. A plotter or drafting table 102 may be provided as a check upon the engraving pattern. The master computer 100 has a program 103 to prepare a control tape 105 by means of the tape output 104. This control tape is then fed to the tape input device 106 of a small digital control computer 107. The control tape 105 is shown in this embodiment as a perforated tape, but it is possible to store the data in other media such as magnetic tape, a magnetic drum, punched cards, etc.

The control computer 107 has a control program 108 that directs said computer in the arithmetic and logic functions necessary to control all the motions of the engraving machine 110 in accordance with the abbreviated information on the control tape. The control computer 107 has a motor control output 109 which drives a plurality of controlled axis motors designated "M" (five illustrated) contained within the engraving machine 110.

Figure 1A:
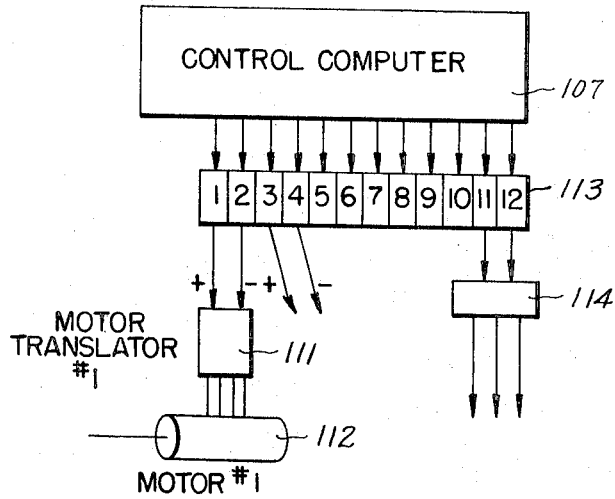
FIG. 1a is a schematic diagram of the motor drive system of FIG. 1.

FIG. 1a depicts a suitable motor drive system for the system illustrated in FIG. 1. The digital control computer 107 is arranged so that a computer word (let us assume for convenience — 12 bits) may be outputted directly from the accumulator (not shown) of the computer 107 to an external register 113. The output word format is such that bits 1 and 2 are designated to control a "First Axis" Motor 112, bits 3 and 4 are designed to control a "Second Axis" motor (not shown), and so on for the five axis motors of engraving machine 110. Stepper motors have been used for all control axes, because of their simple electrical drive requirements, although it is possible to use other types of motors by suitably modifying the system. Specifically, a "1" in bit position 1, in the form of an electrical impulse, when applied to the motor translator 111, will drive the "First Axis" motor 112 one step in the positive direction. A "1" positioned in bit position 2 will similarly drive the motor 112 one step in the opposite direction.

Naturally, if an "0" appears in the register 113 at both bit positions, the motor will remain stationary. The simultaneous occurrence of a "1" in both bit positions is a prohibited condition in this system. The configuration of the first 10 bits of the computer word completely determines the operation of all five motors of the engraving machine 110. The repetition rate of the word output will determine the speed of the motors.

The engraving machine 110 has five axis motors, since it has been determined that the motion of a hand-held engraving chisel making a cut in a workpiece can be broken down into five component motions. Thus, a machine controlled engraving chisel can simulatively respond in like fashion to a hand-held tool, by controlling its motion in the five so determined component axes.

In the general area of line course regeneration, different tool motions may be similarly analyzed and broken down into component motions. Thus, the present system may conceivably be used to guide different machine elements in a myriad of operations such as: printing, machining, marking, milling, scratching, shaping, routing, etc. These other machining techniques can use the same general mathematical approach and computer system. They may require, however, the same, or a greater or lesser number of axis motors to simulate the particular component motions of the specific machine element.

In the present engraving system, it will be noted that the last 2 bits (11 and 12) of the register 113 are not used for motor control, but they may be decoded in 114 to control other machine functions, such as controlling the required air supply to power the air-hammer that drives the engraving chisel, or the amount of coolant flowing to the cutting tip of the chisel.

The overall system requirements and performance may be better understood by examining in detail the characteristics of hand-engraving. It will then become apparent what is required of a machine tool in simulating the hand-engraved pattern.

Figure 2:
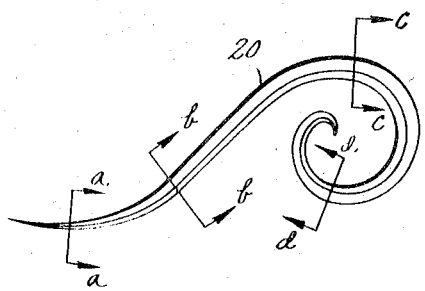
FIG. 2 is a plan view of a typical engraving cut.
Figure 2A:
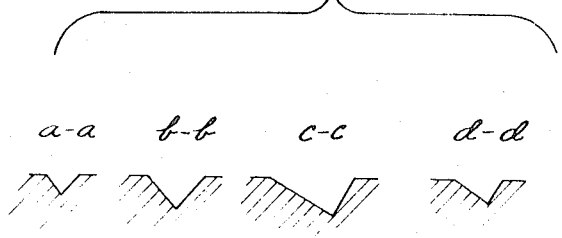
FIG. 2a is a sectional view of the engraving cut of FIG. 2 sliced at various sections along its length.
Figure 2B:
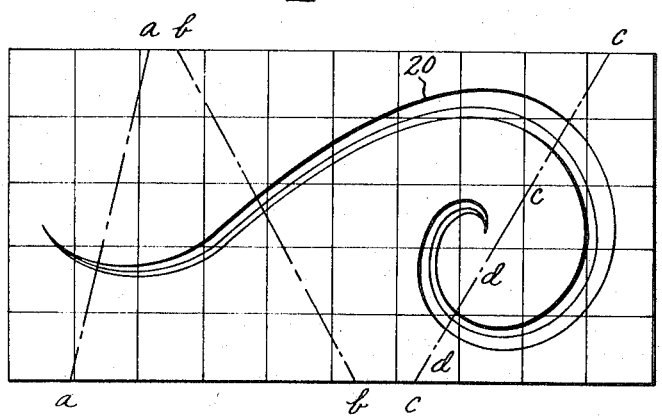
FIG. 2b is a plan view of the cut of FIG. 2 made on a block of metal.

Reference is made to FIGS. 2 and 2b, which show a typical engraving cut 20 sliced at various sections along its length.

Figure 2D:
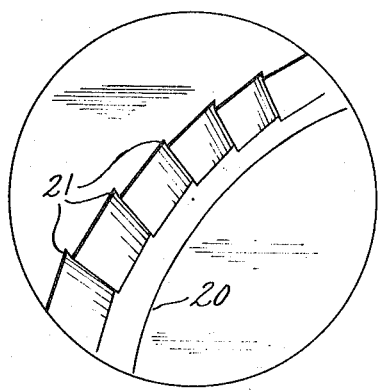
FIG. 2d is an enlarged macroscopic view of a section of the cut shown in FIG. 2c.
Figure 3:
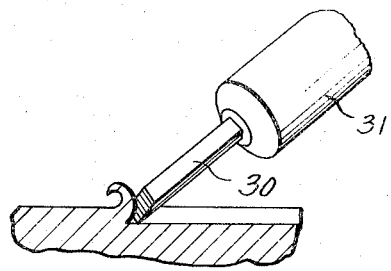
FIG. 3 is a view of an air-hammer and an engraving chisel making a cut in a metallic block.
Figure 3A:
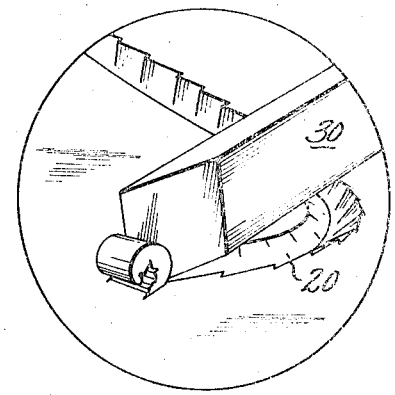
FIG. 3a is an isometric view of the engraving chisel of FIG. 3, making a cut.
Figure 3B:
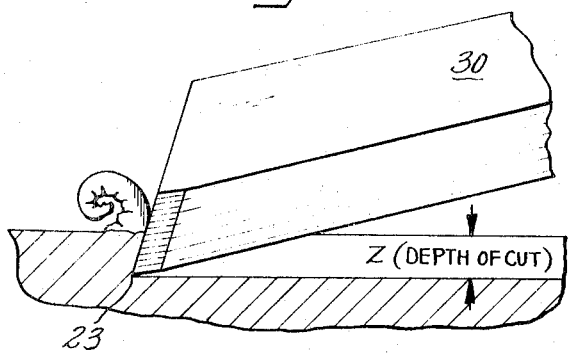

In hand-engraving, the cut is made in the metal with a V-pointed chisel 30 as illustrated in FIGS. 3a and 3b. The chisel is forced to remove the metal by successive hammer blows resulting in the surface finish and cut geometry characteristic of hand engraving, and often producing a faceted sidewall in curved cuts as shown in FIGS. 2d and 3a.

Figure 2C:
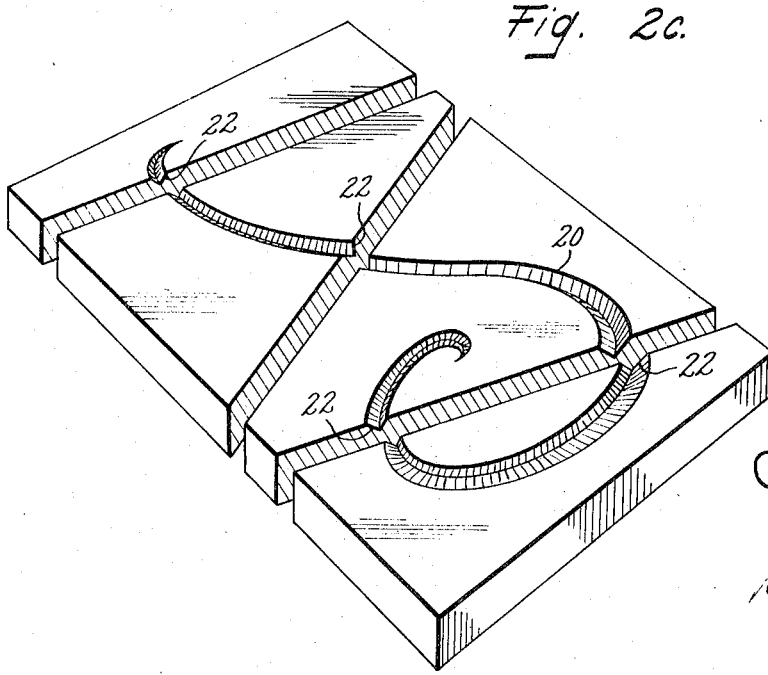
FIG. 2c is an isometric view of the cut in the metal block as shown in FIG. 2b.

FIG. 2dd is an enlarged macroscopic view of a section of the engraving cut 20 of FIG. 2c. Facets 21 have been cut in the metal by the engraving chisel. These facets in addition to the surface finish and cutting geometry give an aesthetically pleasing quality to the cut that cannot be duplicated by embossing, routing, or other simulative techniques.

The V-shaped engraving chisel 30 produces a cut with a V-shape profile 22 as shown in FIG. 2c.

Because the engraver continually adjusts the angle of his chisel with respect to the workpiece as he proceeds to hammer out his cut, this V-shape profile changes along the length of the cut. FIG. 2a illustrates the changing V-shaped profile of the cut shown in FIG. 2. The varying cross-sections are shown for slices made in the cut at sections a through d, respectively. The changing nature of this cross-section profile is known as "siding," and further distinguishes the appearance of the engraving cut from those made by other machining methods.

It should also be mentioned that the width of the cut is influenced by the tilt of the tool with respect to the workpiece.

It is obvious, therefore, that the simulation of a hand-engraved pattern is dependent upon:
 a the shape of the chisel;
 b the successive hammer blows producing the surface finish of the cut; and
 c the geometry of the tool relative to the workpiece.

It was determined that a chisel 30 (FIG. 3) with a cutting face of approximately 90° included angle, driven by a reciprocating mechanism, such as an air or electric hammer 31, will reproduce or otherwise simulate the surface finish of hand chisels.

It was also discovered that the powered engraving tool could be run at a greater cutting speed than a hand-held tool and yet preserve the aesthetics and quality of the engraving cut. The increase in cutting speed was essential for obtaining economical production rates.

Figure 12:
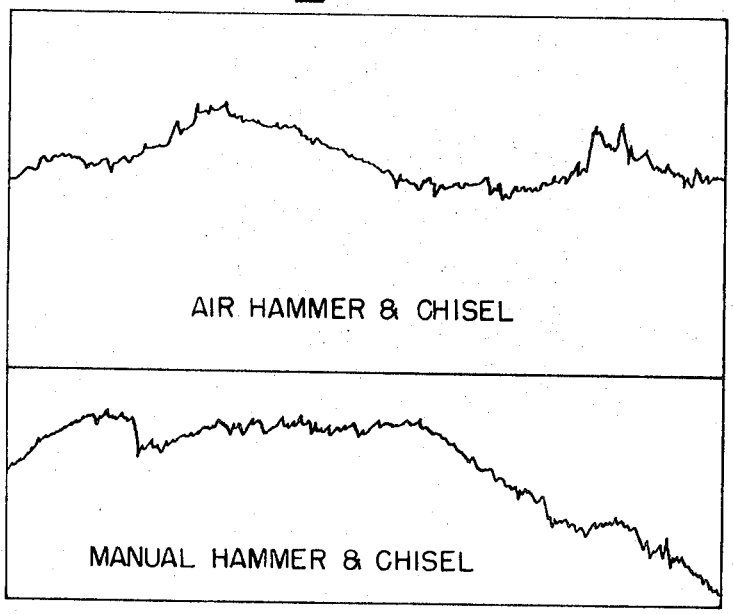
FIG. 12 is a view of surface tracings, respectively, of a machine-made and a hand-made engraving cut.
Figure 13:
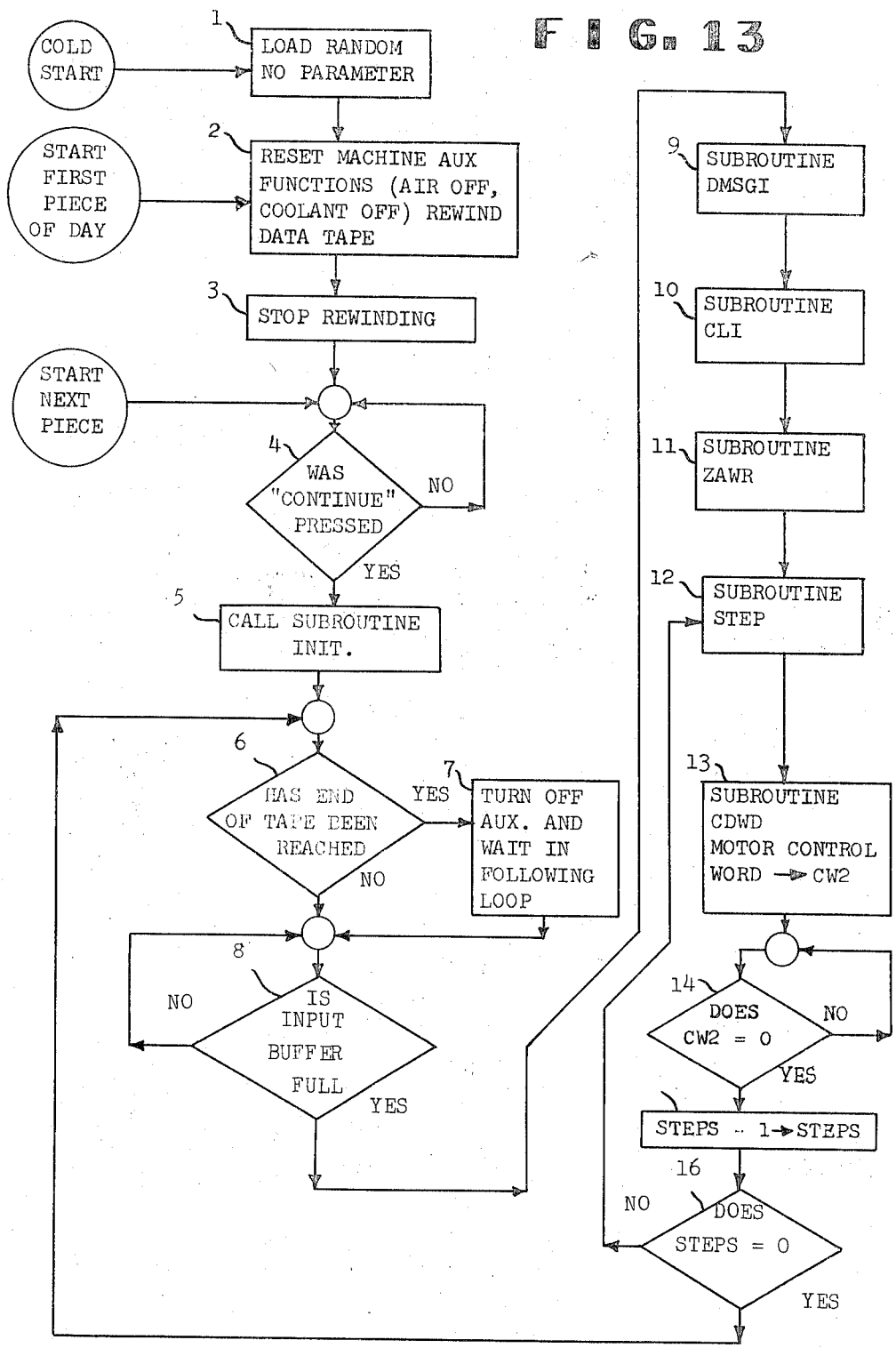
FIG. 13 is a flow chart of the controller control program for regeneration of successive segments of cuts and miscellaneous tool motions.
Figure 14:
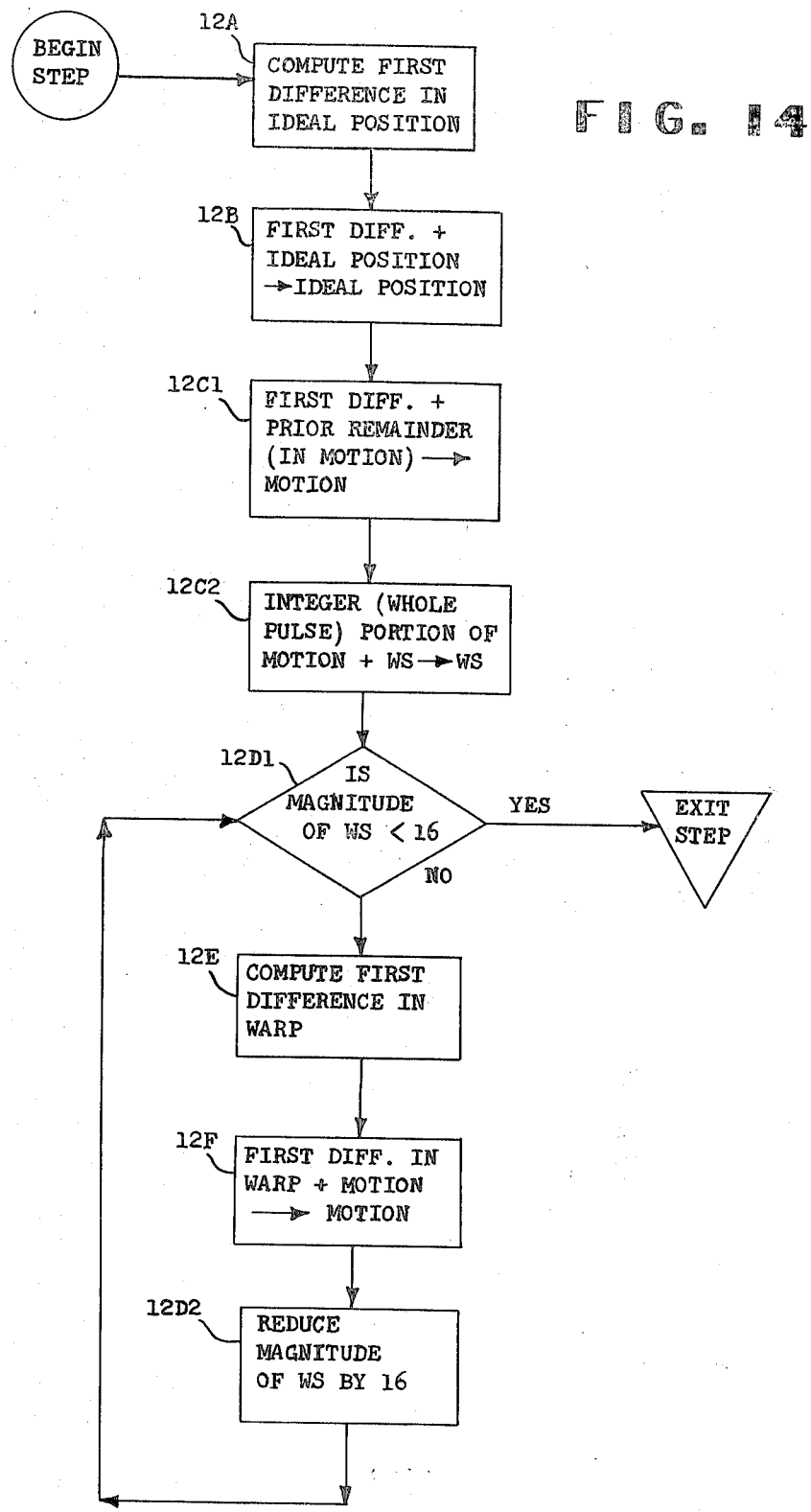
FIG. 14 is a flow chart in a controller control background program for computation of motion for each axis.
Figure 15:
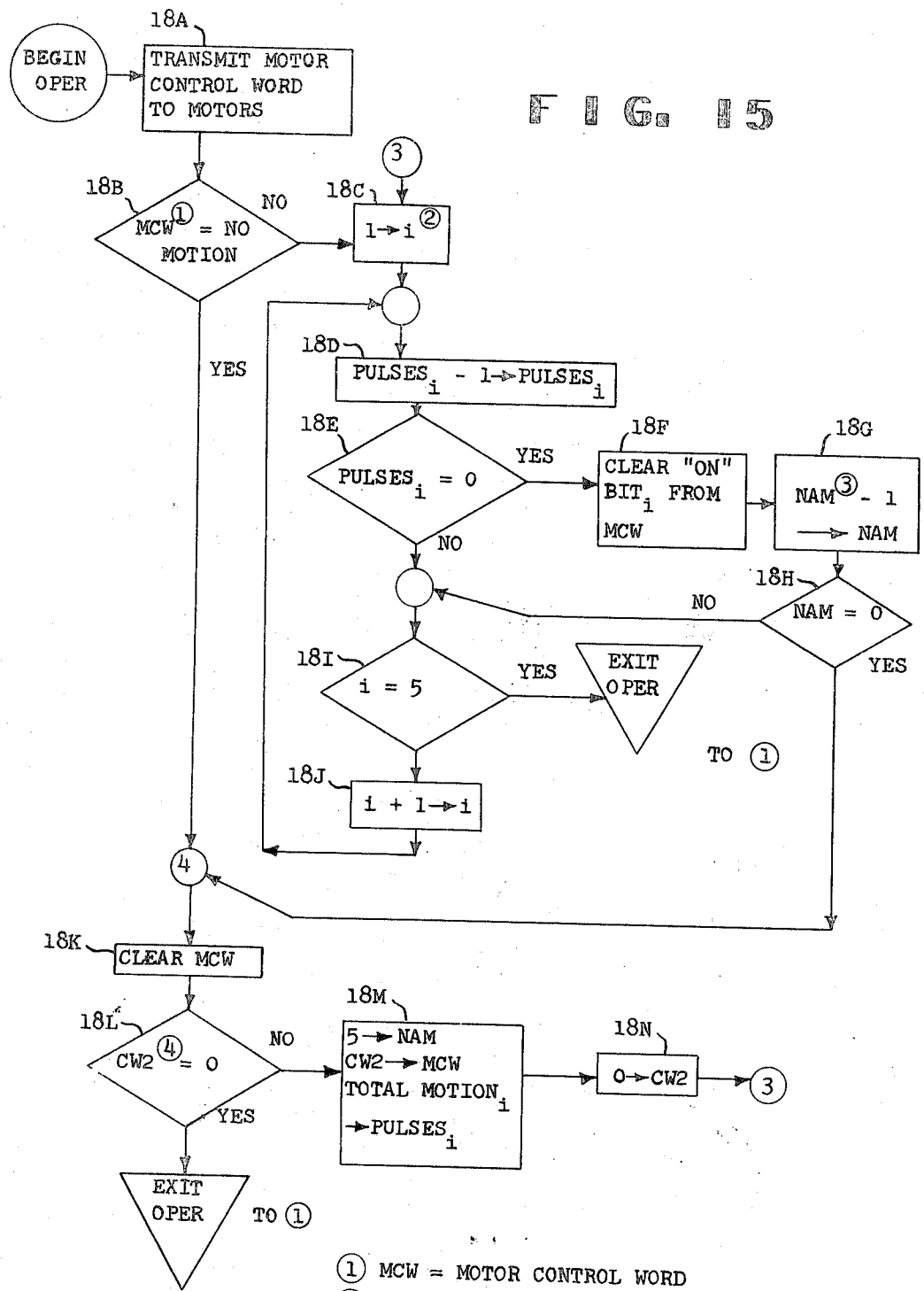
FIG. 15 is a flow chart of a control program subroutine to operate the drive motors.

FIG. 12 shows a surface profile tracing of a portion of an engraving cut made by the powered engraving tool, and the hand-held tool, respectively. As will be observed, the two cuts have almost identical surface finish characteristics, thus demonstrating that the cut made by a powered tool can simulate the surface finish of a hand-held engraving cut, as was aforementioned. Since the surface finish of the cut determines to a large extent the light reflectance characteristics, the visual appearance of a cut made by a power tool can be made essentially identical to that made by a hand-engraving tool.

In confirmation of this, it should also be noted that no visual distinctions were observed between the two cuts, when examined by experts of the engraving art.

Figure 3D:
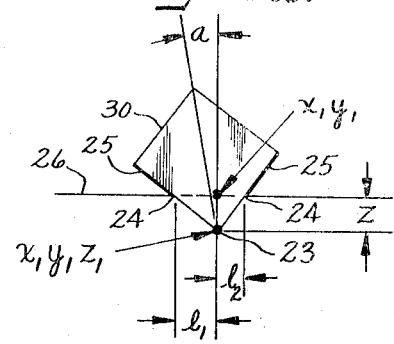
Figure 3C:
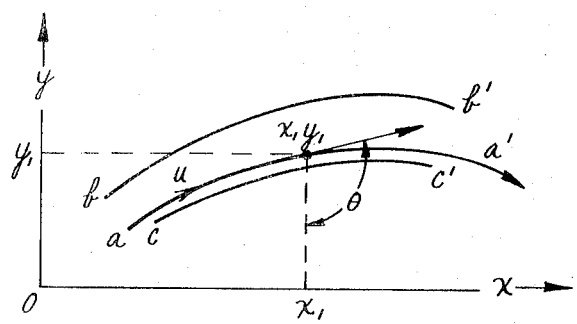
Figure 3E:
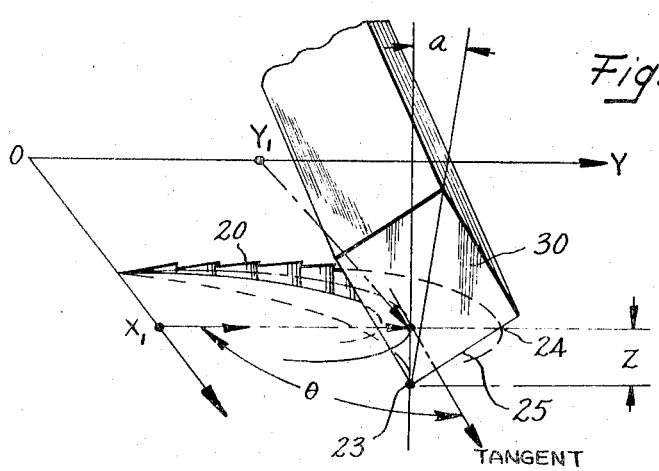

FIG. 3e is illustrative of the geometry of the tool making an engraving cut in a workpiece. It is to be emphasized that the tool motions are analyzed relative to the workpiece, and not to any external frame of reference.

The top view of the cut is shown in the X, Y plane (FIG. 3c) with the cutter motion from left to right relative to the workpiece. The path of the cutter point 23 (FIG. 3d) is shown as line $a—a'$, and the intersection 24 of the cutter face 25 with the surface 26 of the workpiece is shown as lines $b—b'$ and $c—c'$.

At the point $X_1$, $Y_1$, the position of the cutter relative to the workpiece is as follows:
 a. the cutter point is located at a point $X_1$, $Y_1$, $Z_1$, in the coordinate frame in which the X and Y axes are located on the surface of the workpiece and the Z axis extends downward from the workpiece surface;
 b. the cutter heading, i.e., the cutting direction, is along the tangent to the cut at point $X_1$, $Y_1$, at an angle $\theta$ to the reference; and
 c. the cutter face is tilted at an angle $\alpha$ from the vertical, about a horizontal axis through the cutter point. Although there is no limitation to the tool tilt motion about the horizontal axis, it has been found convenient for our machine embodiments to restrict the tilt motion to an axis parallel to the tool heading. However, for other engraving applications it may be desirable to position the tilt axis at some angle to the tool heading, or to provide additional tilt motion.

Since the value of each of the coordinates X, Y, Z, $\theta$, $\alpha$, will, in general, change during the cutting process, each one must be treated as a variable. It is convenient, as will be demonstrated later, to express each variable mathematically as a function of a common parameter, the length $u$ along the cutter point path, thus:

$X = f_x(u)$
$Y = f_y(u)$
$Z = f_z(u)$
$\theta = f_\theta(u)$
$\alpha = f_\alpha(u)$ The required geometry of the cutter relative to the workpiece will determine the basic geometry of the machine tool motions. Thus, the following relative motions are required:

a. the cutter must be positioned to any point in the X, Y plane, over a range encompassing the entire area of the engraved pattern;
b. the cutter must be positioned in the Z direction to any point from the surface of the workpiece downward to the maximum depth of cut. Additional latitude of movement will be required in the X, Y, and Z motions as regards a working machine tool to allow clearance for workpiece replacement.
c. the heading of the cutter (i.e., the forward direction of cutting) must be rotatable in $\theta$ a full 360°, relative to the workpiece, to allow a cut in any direction in the surface of the workpiece. In a practical machine, continuous rotation capability is desirable.
d. the cutter face must be tilted through angle $\alpha$, in a vertical plane, the amount necessary to provide the proper degree of "siding" in the cut. In both the angular motions described, it is desirable to arrange these motions so that each rotation takes place about the cutter point as a center. Thus, the rotation 74 takes place about a vertical axis, and the rotation $\alpha$ takes place about a horizontal axis, with the two axes intersecting at the cutter point. It is obvious in view of the aforementioned geometries of the cutting tool and surface, this restriction eliminates any interaction of variables $\alpha$ and $\theta$ with X, Y or Z.

An additional requirement applicable to all five axes of motion is the necessity for providing smooth, continuous motion in all axes simultaneously, in accordance with the appropriate $f(u)$.

It should be obvious to those skilled in the art that the requirements of relative motion described above may be implemented by several machine configurations. Two preferred configurations will be described herein.

Figure 6:
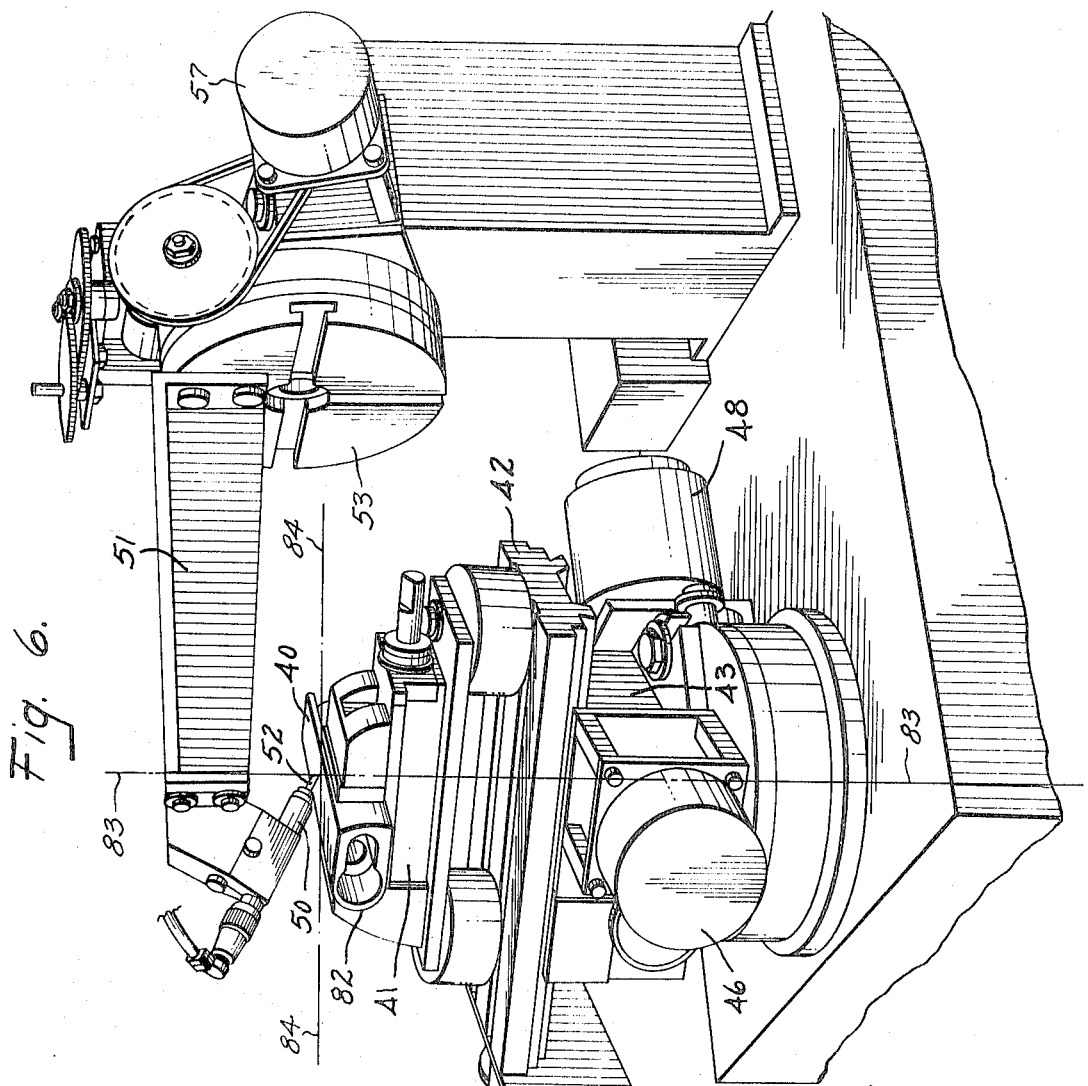
FIG. 6 is an isometric view of another embodiment of the engraving machine illustrated in FIG. 4.
Figure 7:
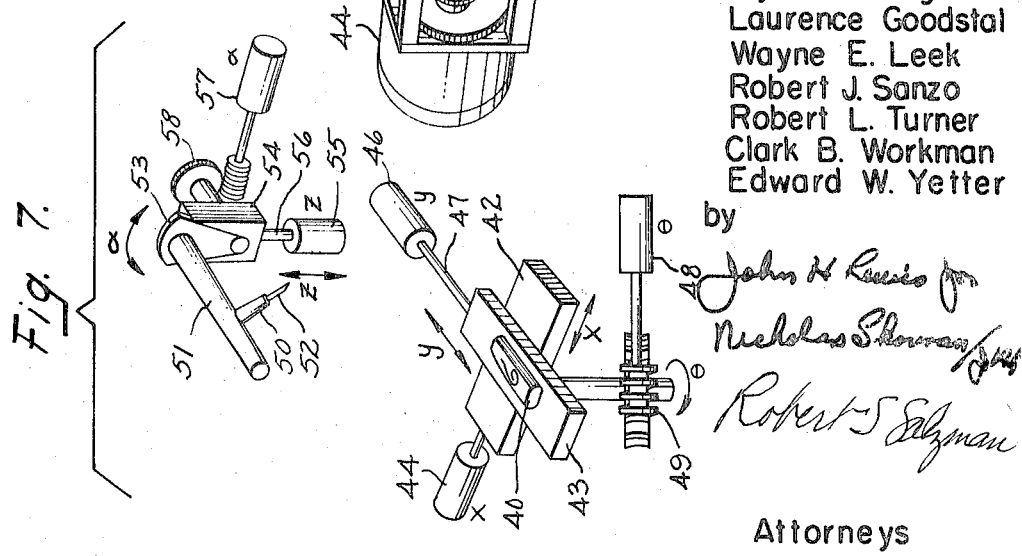
FIG. 7 is a schematic view of two particular features of the machine of FIG. 6.

FIG. 6 shows a machine suitable for engraving relatively small workpieces. The workpiece 40 is the receiver of a firearm, and is restrained in vise 41 mounted on table 42. The machine is constructed to provide rectilinear motion along the X and Y axes, and rotational motion to the table 42 about vertical axis 83. The rectilinear motions X and Y are provided by a double cross-slide arrangement 42 and 43 which is shown schematically in FIG. 7. The entire cross-slide arrangement is mounted on bearings so that it may rotate about a vertical axis to provide for the $\theta$ variable. Driving motor 44 operating through lead screw 45 moves the workpiece with respect to the X axis. Similarly, driving motor 46 operates through lead screw 47 to move the workpiece along the Y axis. Drive motor 48 operates the worm gear arrangement 49 to provide rotation ($\theta$) for the workpiece about a vertical axis intersecting the tool point. The air-hammer drives the engraving chisel 52, and is mounted on an overhead arm 51. The arm 51 is mounted on a rotatable head 53 to provide tilting motion ($\alpha$) of the tool about horizontal axis 84 with respect to the workpiece. This mounting arrangement produces a horizontal axis of rotation for the tool which intersects both the cutter point and the vertical axis of rotation of the X and Y cross-slide. The entire arm and rotatable head assembly are mounted on a vertical slide 54, thus providing for motion along the Z axis. The driving means for the $\alpha$ axis is motor 57 coupled through, preferably, a worm gear arrangement 58. The vertical slide 54 is driven by motor 55 and vertical lead screw 56.

As was aforementioned, several motor types may be used to power all five of the axes of the machine. The use of stepper motors, however, has been found to be particularly convenient.

Figure 4:
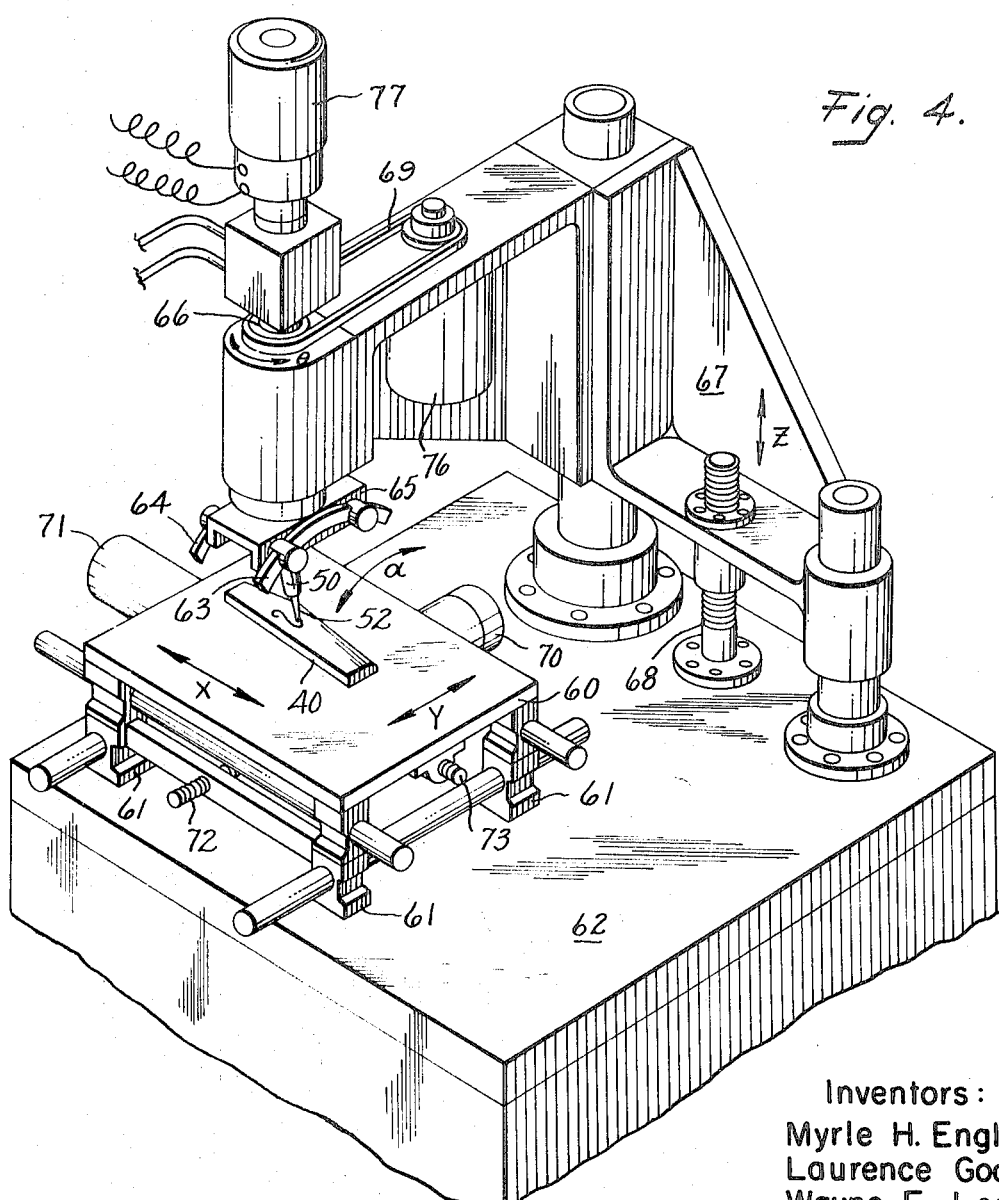
FIg. 4 is an isometric view of the embodiment of the engraving machine.

Another machine embodiment is shown in FIG. 4. This machine incorporates the same geometrical relationships of tool and workpiece, but is designed to handle larger workpieces than the machine of FIG. 6. A receiver 40 is mounted as before upon a double cross-slide arrangement 60 to furnish motion along the X and Y axes, respectively. The base of the cross-slide unit, however, is rigidly fixed to the machine base 62 at points 61. The chisel 52, and its air-hammer 50, is mounted on a carriage 65 constrained to move over a portion of a circular path by means of arcuate guide rails 63 and 64, respectively. (Also see FIG. 11). The rotation of the tool has the center of the arc located at the cutting tip of the chisel 52. This provides for the tilt motion, or $\alpha$ axis. The carriage assembly 65 is supported upon a rotatable spindle 66, thus providing the $\theta$ axis motion. The combination of the spindle 66 and the tiltable carriage 65 is supported on movable frame 67, which is moved along the Z axis by lead screw 68.

One of the major design differences between the two machine embodiments is that the $\theta$ motion is provided to the work support table 41 in the machine of FIG. 6, whereas the tool is provided with the $\theta$ motion in the machine of FIG. 4.

Many machine variations can be made, since movement along any particular axis, whether it be the X, Y, Z, $\alpha$ or $\theta$, can be imparted to either the workpiece or the engraving tool. That is so, because we are always dealing with relative motions between the chisel and the workpiece. It is deemed by the inventors that any modifications of this nature lie within the scope and purview of this aspect of the invention.

As in the previously described embodiment of FIGS. 6, the X and Y motion is provided by stepper motors 70 and 71, respectively, acting upon lead screws 72 and 73, respectively. The lead screw 68 for the Z axis is also activated by a stepper motor (not shown).

Figure 11:
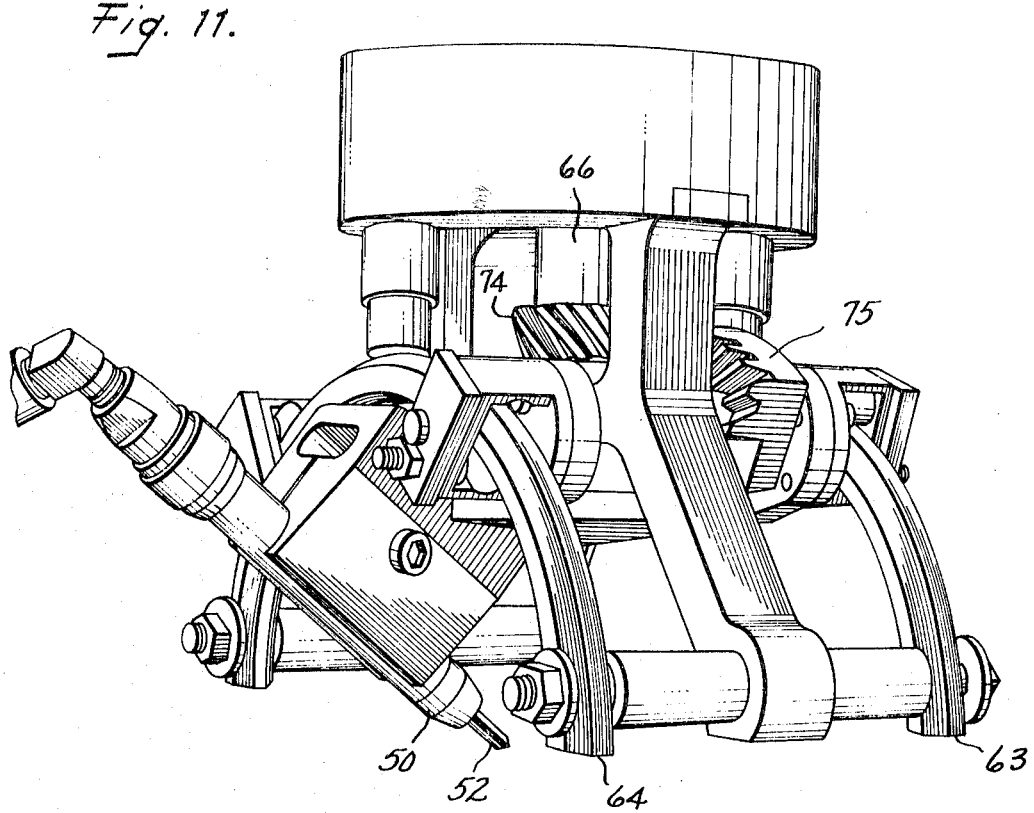
FIG. 11 is an isometric view of the carriage portion of the machine shown in FIG. 4.

The $\theta$ motion may be provided by gearing, or by a chain and sprocket drive 69 driven by motor 76, as shown. The tilting motion ($\alpha$) is produced by a spiral bevel pinion 74 acting upon the gear sector 75 as depicted in FIG. 11. The motor 77 driving the spiral bevel pinion 74 is mounted on the upper portion of the rotatable spindle 66. Both rotation motors are preferably stepper motors.

Figure 5:
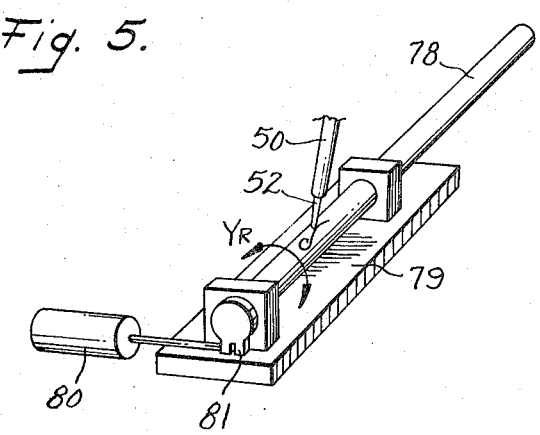
FIG. 5 is a schematic view of a particular modification of the machine of FIG. 4.

Up until now, machine engraving has been illustrated with reference to flat work surfaces. The described embodiments may be used to produce an engraving pattern in curved surfaces, or in those surfaces in which the deviation from a plane surfaced workpiece does not exceed the machining limitations. Where these limitations are widely exceeded, however, additional modifications can be made in the machine to accommodate for these changes. For example, FIG. 5 shows an engraving cut being made in a gun barrel 78 having a cylindrical surface. In this case, the geometrical relationship between the tool point and the workpiece surface is maintained by substituting a rotary motion $Y_r$ for the rectilinear motion Y. The gun barrel 78 is centered for rotation upon fixture 79. Fixture 79 may be mounted upon cross-slides 60, or may be made as an integral part of the workpiece support structure. The gun barrel is rotated by stepper motor 80 driving the worm gearing 81.

The rotation $Y_r$ of the workpiece taken together with the linear X, and the $\alpha$, Z, and $\theta$ motions produce the engraved pattern in a cylindrical surface equivalent to that produced on a planar surface.

The curved top surface 82 of the receiver 40 of FIG. 6 may be engraved in this way, in like fashion to its flat side portion.

The operation of the overall system, as was discussed with reference to FIG. 1, is capable of producing even the most intricate engraving patterns. The basic information which must be inputted to the system, as was aforementioned, in the X, Y, location of each point of every cut in the X, Y, plane, and information regarding the cut depth Z and tool tilt $\alpha$. This information can be entered in to the master computer 100 in any one of several ways. The data may be transcribed manually from a sketch of the pattern to punched cards, tape, or to other suitable computer input devices. The data may also be entered by one of several graphic input devices which automatically enter the X and Y data into the computer. The $\alpha$ and Z data may then be entered manually as with a keyboard input, or automatically generated internally within the master computer. Very often simple relationships exist between the Z and $\alpha$ data, and the X and Y characteristics of a cut such as length and curvature. This makes it possible to automatically generate this data.

The Z and $\alpha$ motions provide the shaded appearance in the engraving cut. It is more important that they vary smoothly, than that they exactly reproduce a preselected pattern. Also, the maximum depth and tilt tend to be invariant in any one pattern, and their rate of increase and decrease as a function of the cut length may follow a stereotyped form.

FIGS. 10 and 10a show the longitudinal depth variation of two characteristic cuts. The maximum value for Z in both cases tend to remain constant for several cuts, thus permitting a simple stereotyped definition of these curve types. FIG. 10 depicts a typical border or outlining cut in which tool entrance and exit ramps are determined only by machine limitations.

FIG. 10a illustrates a typical scroll cut in which a shaded appearance is desirable. The depth gradually increases until a maximum is reached, and remains at this maximum until a rapid decrease in depth ends the cut. In the cut of FIG. 10, the tilt ($\alpha$) is normally zero.

In the cut of FIG. 10a, the tilt will normally be toward the outside of the scroll curvature, and will vary in a manner similar to the depth (Z).

A fixed algorithm can thus be employed to minimize the manual data input and simplify the data reduction. A corolary benefit is achieved if the characters specifying the desired algorithm are passed on to the controlling computer 107 in place of the two sets of cubic co-efficients otherwise required. Thus, this is one means of reducing the amount of information to be stored on the perforated tape 105, or other storage medium, for introduction into the control computer 107.

As the descriptive data is received within the master computer 100, it is gathered and stored in units or "packages." Each package contains all the data necessary to make one individual cut. Packages are automatically labeled to facilitate later modification or correction, as will be explained in more detail hereinafter.

Next, each of the four variables X, Y, Z and $\alpha$ for each cut, is fitted to one or more parametric cubic equations.

The dependent variable $\theta$ is derived from the X and Y data, and also fitted to a parametric cubic. Alternatively the variable $\theta$ may be derived in the control computer, thus furnishing another means of reducing stored data.

The derived parametric equations are plotted in a form simulating the final appearance of the cut pattern, as shown in FIG. 8 (full size) and in part in FIG. 9 (10X). The plot made at 10 times full scale is useful for correcting errors. For example, the portion of the cut in FIG. 9 designated at 85 shows an error, in that the curve is distorted at this point. The plot shown for the design (FIG. 9) is arranged to present all the information of the cut in pseudo three-dimensional form. A preliminary appraisal, however, of the overall pattern appearance is obtained from the full scale plot (FIG. 8). Provision has been made in the present system for plotting the control tape information concurrently with or immediately after data reduction (see FIG. 1, elements 100, 102 and 104). Corrections may be made by manually reintroducing input data as before for only those cuts requiring modification. Constants of the corrected curves are then punched by the output 104 into control tape 105 with the other required data, such as coolant flow control.

The resulting tape may now be used repetitively in the manufacture of the engraved pattern. The constants of the cubic equations are fed into the control computer 107, and this computer generates from these constants, the original curves in increments (point-by-point).

Each curve as fed into the computer is warped slightly on a random basis, so that no pattern will ever be duplicated exactly. This is done to further insure that the machined pattern will have the appearance of a hand-engraved pattern. The method of warping will be explained in greater detail hereinafter.

As each increment of each curve is generated, the corresponding steps of each control motor are computed. Computer output words are assembled, each word containing an individual step instruction for each motor, and outputted to the motor control section 109. Incidental machine function instructions are incorporated into the output words as required.

DATA PROCESSING

The input data for each axis may be smoothed if necessary to reduce random variations. The tool angle $\theta$ is generated from the smoothed X-Y data. Polynomial curves preferably of the third degree are fitted to the smoothed data, resulting in one polynomial for each of the five axes. The independent variable $u$ used as the common parameter for these polynomials is preferably taken as the "string length" along the curve. The set of equations is then:

$X = a + bu + cu^2 + du^3 + \ldots;$
$Y = e + fu + gu^2 + hu^3 + \ldots;$
$Z = + ju + ku^2 + lu^3 + \ldots;$
$\theta = m + nu + pu^2 + qu^3 + \ldots;$
$\alpha = r + su + tu^2 + vu^3 + \ldots$ Such a set of equations will describe a segment of a cut and contiguous segments will have a common slope. It should be noted that these parametric equations permit, for example, a Y motion when there may not be an X motion. In this case, had X been selected as the independent variable, the Y motion as compared to the X motion, would have had an infinite rate. This would be unacceptable. There are other methods for handling this, but they are much more cumbersome than the parametric equation method.

In general, any real continuous machine cut will be broken up into as many segments as are required to fit the collected data within the required tolerance. The choice of satisfactory tolerance magnitude for any pattern will depend upon two conditions:

a. Reproduction of the essential character of the original pattern to a reasonable degree of accuracy, and
b. Ensure that all curves within the pattern have a smooth aesthetically pleasing character. The latter requirement, generally resulting in a larger magnitude, has two ancillary benefits:
1. Minimization of data smoothing, and
2. Reduction of the required number of curve segments. The use of cubic polynomials limits a segment to encompassing at most one maximum and one minimum on each variable.

Zero order $(a, e, i, m, r)$ coefficients are not required for an incremental motion machine, except to move from the origin or the end of one cut to the start of the next cut. Therefore, the standard information consists of the other 15 coefficients and the string length, or upper limit of $u$. This information is stored in a suitable medium such as punched paper tape. Where zero order coefficients are required, a set of pseudo cubic coefficients is constructed in which $a$, $e$, $i$, $m$, and $r$ replace $b$, $f$, $j$, $n$, and $s$; all other coefficients are zero and the string length $u$ is set to 1.0000. The cubic coefficients are stored in perforated tape or other media as cubic difference coefficients.

MACHINE CONTROL

Professor S. A. Coons of MIT has shown that successive values of a dependent variable in a cubic polynomial (or any polynomial) can be regenerated from the first, second, and third differences (or higher for higher order polynomials using a simple arithmetic procedure which requires only the operation of addition. (See reference Mass. Institute of Technology, Electronic Systems Laboratory, Memorandum MAC-M-253). For this reason, it can be implemented easily and executed rapidly on a small computer. Furthermore, this arithmetic process produces directly, at one stage, the differences ($\Delta x$, $\Delta y$, $\Delta z$, $\Delta \theta$, or $\Delta \alpha$) for the variables. For error detection and other purposes, the sums of the differences, which define the current tool position, are recorded.

The above operations are carried out in integer arithmetic so that they can be performed rapidly in a small inexpensive computer. They are suitably scaled to minimize round-off errors.

Random variations of a limited nature between fabrication of successive parts is introduced during regeneration of the cubics. For this purpose, the five axes are handled in three different ways:

Tool Angle $\theta$ is normally not varied. It is essentially a function of $\Delta x$ and $\Delta y$ and minor variations in these values do not necessitate a variation in $\Delta \theta$.

$\Delta z$ and $\Delta \alpha$ are scaled according to "independent" random numbers. To maintain continuity from segment to segment, new random numbers are generated only at the start of a new cut. The $\Sigma \Delta Z$ over a complete cut from start to finish will be 0.0 regardless of the scale factor. The same is true for $\Sigma \alpha$ if the tool starts and returns to zero tilt.

$\Delta X$ and $\Delta Y$ must be varied in such a manner that any two cuts which would have met at a point before random variations are applied, must still meet at some point, though generally not the original point. This is accomplished by establishing a warping of the entire pattern at the start of the operation. A set of random numbers is generated and held constant throughout the entire pattern. These numbers are the difference coefficients which determine cubic warping polynomials.

$X' = f(x)$
$Y' = f(y)$ The actual tool position is then:
$X_{tool} = X + X'$
$X_{tool} = Y + Y'$ where: $X'$ and $Y'$ are generally small in comparison to X and Y and $X' = Y' = 0.0$ when $X = Y = 0.0$.

It is important to note that for any closed course such that $\Sigma \Delta X = \Sigma \Delta Y = 0$, then $\Sigma \Delta X' = \Sigma \Delta Y' = 0$.

The arithmetic operations in the control computer which handle the warping polynomials are similar to those that handle the polynomials descriptive of the pattern.

DESCRIPTION OF FLOW CHARTS

The numbers preceding each paragraph refer to the numbered elements of the flow charts shown in FIGS. 13-16.

1. Use of the switches on the computer console for entry of the initial random number eliminates the need for, and dependence on, an auxiliary device such as a teleprinter. The random number generator algorithm requires an odd number. The program adjusts the low order bit to insure this condition.
2. Proper control signals are transmitted to turn off all auxiliary functions of the machine, and to rewind the spool of paper tape containing the pattern data.
3. The signal to stop the rewind is transmitted as soon as information is encountered on the data tape characterizing its beginning (see also 5 below).
4. A push-button is actuated to start processing when a new workpiece is in position.

5. To eliminate any ambiguity in the positioning of the data tape, it is searched in a forward direction for the end of the information characterizing its beginning. Working areas in the computer's memory are cleared, etc., and the "end of tape" flag is reset. Six random numbers are generated and become, for the X and Y axes, the third second and first warp difference coefficients, $\triangledown 3_{wx}$, $\triangledown 2_{wx}$, $\triangledown 1_{wx}$, $\triangledown 3_{wy}$, $\triangledown 2_{wy}$, and $\triangledown 1_{wy}$. These differences are scaled:

$$\triangledown 3_{wi} = \triangledown 3_{wi} \times 1$$
$$\triangledown 2_{wi} = \triangledown 2_{wi} \times 8$$
$$\triangledown 1_{wi} = \triangledown 1_{wi} \times 64$$

This is done for reasons similar to those in step 9c below. Usually, there will be a need to limit the affect of warping to zero at the boundaries of the area being engraved. To force warping to be zero at a distance XN inches from the origin on a machine requiring 1,600 pulses for 1 inch of travel, and executing one warp step for every 16 pulses of ideal pattern travel:

$$N = XN * 1,600/16$$
$$\triangledown 3_{wx} = -3((N+1)\triangledown 2_{wx} + 2\ \triangledown 1_{wx})/(3N+2)$$

Similarly for Y:

$$N = YN * 1,600/16$$
$$\triangledown 3_{wy} = -3((N+1)\triangledown 2_{wy} + 2\ \triangledown 1_{wy})/(3N+2)$$

6. When the engraving is completed and the end of the data tape is encountered, the interrupt handler will set the "end of tape" flag and start the tape rewinding. When the tape unit completes rewinding, the interrupt handler will exit to the background program at the specific location where processing of the next piece is begun.
7. When cutting is complete, all machine auxiliary functions are turned off.
8. The background program waits in this loop until the interrupt handler determines that a full block of data has been entered from the tape reader.
9. Subroutine DMSGI scales and rearranges data.
   a. The block type is converted from an 8-bit signed integer to a 12-bit signed integer.
   b. The difference coefficients for any axis are converted from 16-bit (two tape characters) signed integers to 24-bit (two computer words) signed intergers.
   c. The second difference coefficient is multiplied by 16 and the first difference coefficient is multiplied by 256. (In later use, a scale factor of 1/65536 is assumed for all coefficients.) This permits relatively greater precision for the higher difference coefficients which is permitted because they are smaller values and is required because they are added into the machine motion many more times than the first difference coefficient.
10. Subroutine CLI initiates the reading of the first character in the next block of pattern data.
11. Subroutine ZAWR detects when a cut is to be begun or stopped by examining the ideal depth for zero and the direction of the impending z motion. At the beginning of a cut, a first difference coefficient is generated as a function of a random number and limited in such a way as to produce a maximum variation in depth equal to 0.25 times the characteristic depth. If for every 16 ideal pattern pulses one warp step is to be taken and 8000 z pulses are required for 1 inch of vertical travel and the characteristic cut depth is 0.008 inch, the maximum number of warp steps will be:

$$N = 0.008 * 8000/16 = 4.0$$

Inasmuch as the third and second warp difference coefficients for z will be zero:

$$\triangledown 3_z = 0$$
$$\triangledown 2_z = 0$$

Then the behavior will be linear and the first difference coefficient must be limited to the range $$\pm 0.008 * 0.25/4.0 = \pm 0.002$$

The tilt warp coefficients are treated identically to the above except that the range is reduced to $\pm 0.125$ of full travel to one side.

12. Subroutine STEP is flowcharted in detail in FIG. 14.

The equations involved are:
12A. Summation of differences for ideal pattern motion.

$$\triangledown 2_i = \triangledown 2_i + \triangledown 3_i$$
$$\triangledown 1_i = \triangledown 1_i + \triangledown 2_i$$

Where the subscript $i$ represents any one of the drive motors.
12B. IDEAL POSITION $i$ = IDEAL POSITION $i$ + $\triangledown 1_i$
12C1, 2. IDEAL MOTION $i$ = INTEGER VALUE OF $\triangledown 1_i$ + PRIOR REMAINDER $i$
12D1, 2. NO. OF WARP CUBIC STEP $i$ = IDEAL MOTION $i/16$
12E. Summation of differences for warp motion $$\triangledown 2_{wi} = \triangledown 2_{wi} \pm \triangledown 3_{wi}$$
$$\triangledown 1_{wi} = \triangledown 1_{wi} \pm \triangledown 2_{wi}$$

Where the sign of the operation is the sign of the ideal motion.
12F. TOTAL MOTION $i$ = INTEGER VALUE OF ($\triangledown 1_i = \triangledown 1_{wi}$ = ANY PRIOR REMAINDER $i$)

13. The total motion represents the number of pulses to be delivered to that motor during one step along the cut. The number, or count, of pulses is generally different for each drive motor and may be anything from zero to 100 or more. At the end of each time period, those motors having a positive remaining count each receive one pulse, of proper sign, and the corresponding count is reduced by one. The step is completed when all such counts have been reduced to zero, i.e., there are zero active motors. The number of motors active at the beginning of the step is computed as follows:
   a. Prior to starting the step, the absolute integer value of the first difference of position of each drive motor, plus an arbitrary one, is stored as the count of pulses for that motor.
   b. At the start of the step, the number of active drive motors is set equal to the total number of axes, e.g., 5.
   c. Without operating any drive motors, the individual counts are each reduced by one. When any count equals zero, the number of active motors is reduced by one.

This procedure permits a section of the program, which is required for actual motor operation, to compute the number of active motors at the beginning of a step. The arbitrary additon in (a) and the reduction in (c) cancel each other.

14. When the interrupt handler accepts the new information, it sets CW2 equal to 0, indicating that the background program can process another step.

15. The number of steps remaining in the current cut or cut segment is reduced by one.

16. If the required number of steps has not been processed, another step is taken, otherwise another block of data from tape will be processed.

Figure 16:
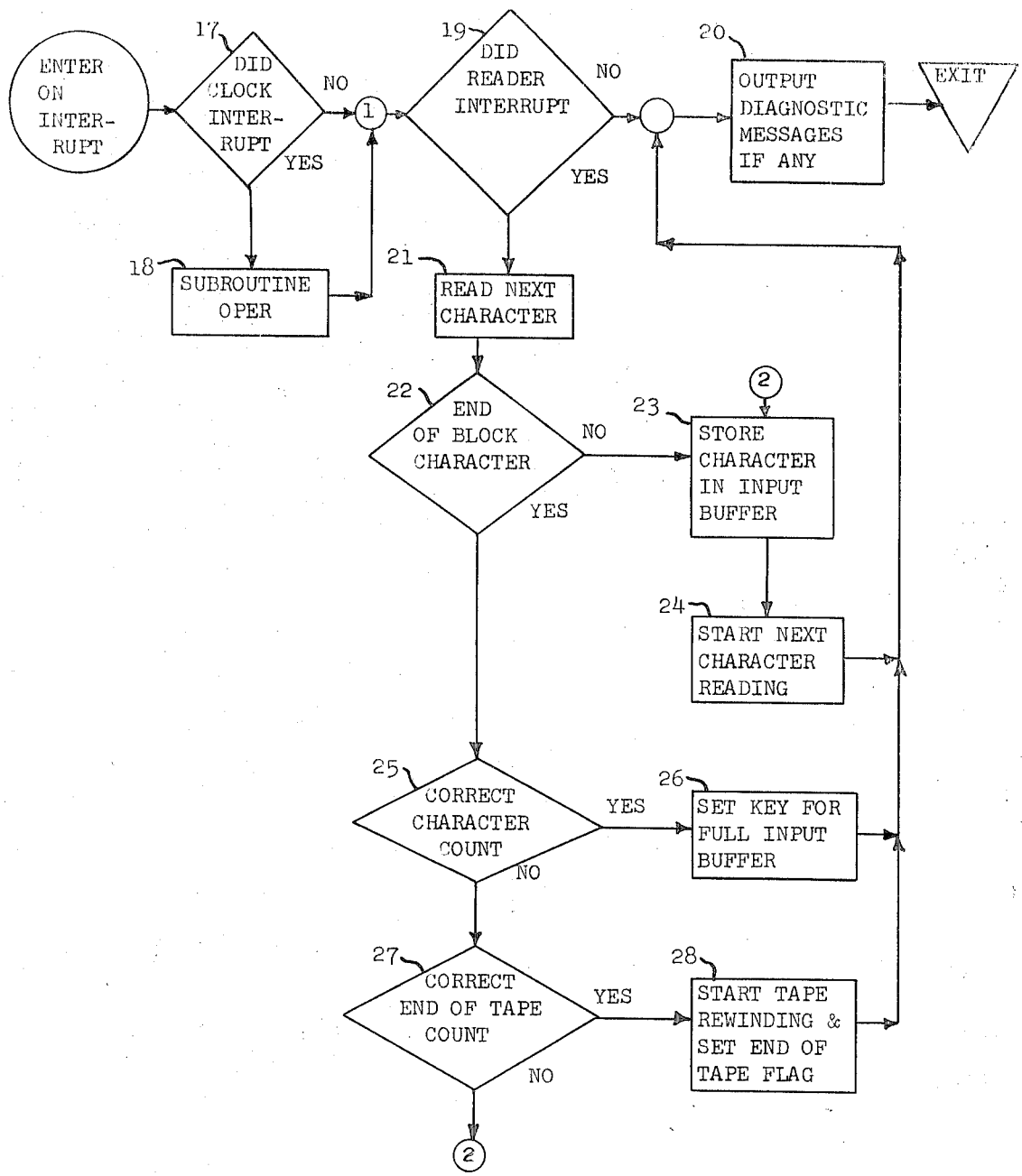
FIG. 16 is a flow chart of a control program for interrupt handling.

17. The "clock" timing circuitry will cause an interrupt after a fixed interval of time, e.g., 1/300 sec. (FIG. 16).

18. The subroutine OPER is flowcharted in detail on FIG. 15 (18A–18N) as described below.

18A. The motor control word (MCW) contains all the information to control each drive motor for one pulse of motion, i.e., one clock timed interval. The identical MCW may be transmitted to all engraving machines interfaced to the controller.

18B. The motor control word is examined to determine if any motion is implied, i.e., are any of the "ON" bits nonzero?c 18C. In the following steps, the MCW bits controlling each motor will be treated separately starting with the first motor, e.g., the X drive motor.

18D. The pulse count for the subject motor is reduced by one.

18E,F. If the pulse count for the subject motor has just been reduced to zero, set the corresponding "ON" bit to zero.

18G,H. Reduce the number of active motors (NAM) by one. If the number of active motors is zero, all pulse counts have been exhausted.

18I,J. If all drive motors, e.g., 1–5, have been considered, exit; if not proceed to process the pulse count for the next motor.

18K. Set those bits in the MCW which control the direction of motion to zero. Those bits which control the auxiliary functions are not changed.

18L. Determine if the next motor control word (CW2) is available.

18M. Set the number of active motors equal to the total number of drive motors, e.g., 5. Move CW2 to MCW and transfer the next total motion for each drive motor to the pulse count for that motor.

18N. CW2 is set to zero. This will signal the background program to process the data for the next step along the cut. (At this point, a dummy motion block of data may be detected which requests a change in the status of the auxiliary functions. In this case, these functions are turned on or off, as necessary, and the control program repeats from (4)).

19. Whenever the pattern data input device has completed reading a character, it will cause an interrupt.

20. Printed diagnostic information, if any, is buffered and delivered to the printing device by an output handling subroutine.

21,22. The character is transferred from the input device and examined to see if it is equal to the designated "end of block" character, e.g., minus zero.

23,24. The character is stored in the input buffer area and reading of the next character is initialized.

25,26. If an "end of block" character is encountered in a legitimate end of block location, e.g., the thirteenth or the thirty-third character location*, the "INPUT BUFFER FULL" indicator is set. (If an end of block character is not encountered by the time the thirty-third character is read, processing is halted).

27,28. If an end of block character is encountered in the first character location*, it signifies the end of the data tape; rewinding is started and the END OF TAPE indicator is set. *NOTE: If, for example, eight channel paper tape is used as an input medium and minus zero is the end of block character, minus zero may also occur as a legitimate value, or a high order or low order portion of a legitimate value. The data tape preparation program must prevent this occurring in the first or thirteenth character position by making a suitable substitution.

Figure 17:
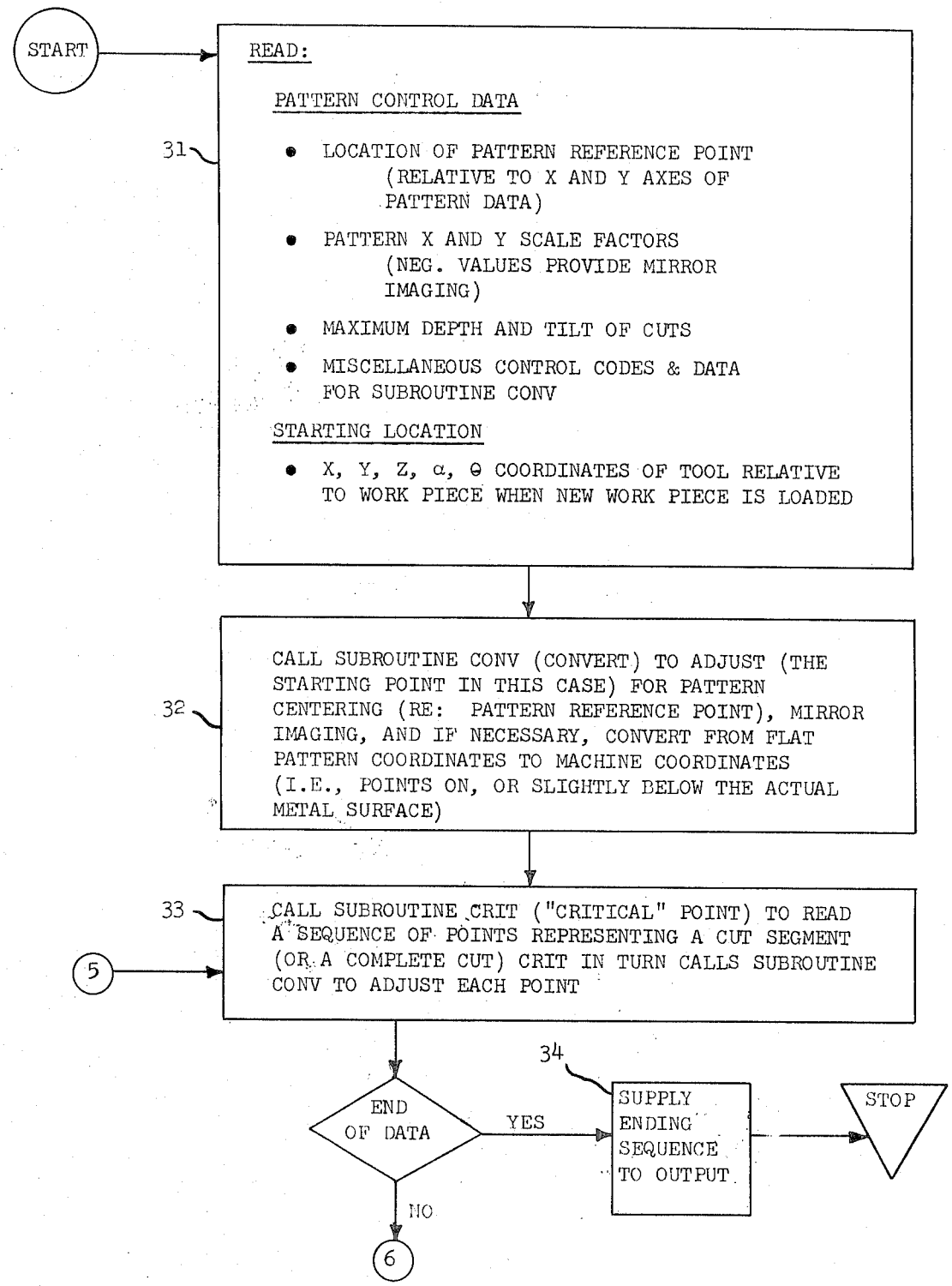
Figure 18:
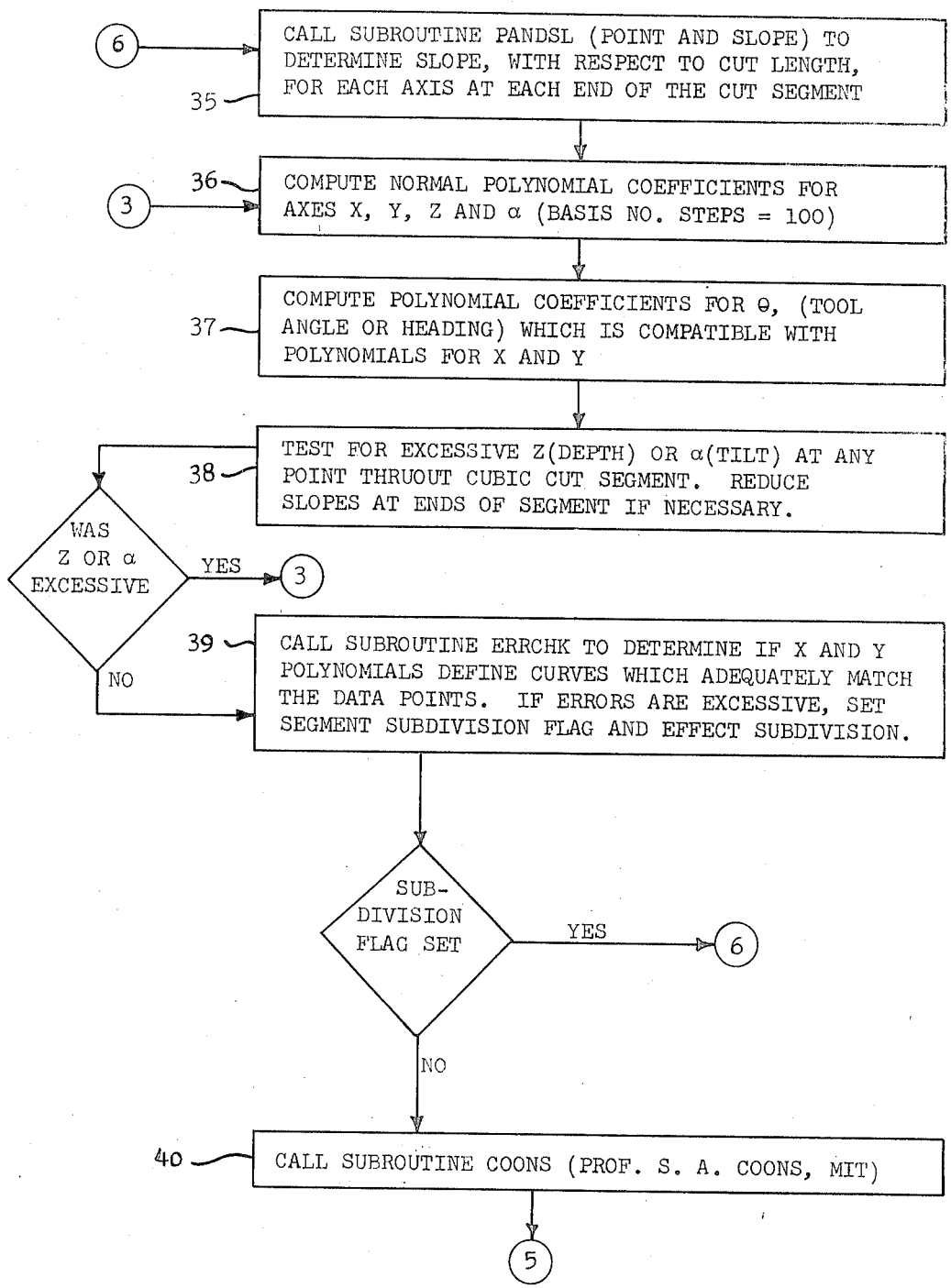

The numbers preceding each of the following paragraphs refer to the numbered elements of the flow charts shown in FIG. 17–19 which are flow charts of the master computer for determining and storing coefficients.

31. When cutting on a flat surface, selection of a suitable pattern reference point and a suitable starting location, combined, have the effect of determining the amount of initial motion from some predetermined machine position to the workpiece. When cutting on a nonflat surface, it is highly desirable to also take into account the description of the metal surface. For example, if the surface is a right circular cylinder with a horizontal axis, the reference point should be on the metal surface somewhere immediately above the axis. Similarly, if the surface is an upright torus, the reference point should be on the outer metal surface immediately above the center of the torus. 32. Subroutine CONV is based on the assumption that the pattern data are obtained from a test patern cut in a flat work piece. CONV, under the control of miscellaneous codes and data read in at the start of the main program, makes any conversions to the data necessary to conform to the shape of the actual metal surface. Examples of conversions are:

a. A 90° rotation in the X-Y plane temporary storage $= x$
$x' = y$
$y' =$ temporary storage b. A mirror image about the y axis with a concurrent four-fold reduction in size.
$y' = y/4$.
$x' = x/(-4)$.

c. Substitution of piece rotation for the normally horizontal x axis in order to cut a horizontal right circular cylinder of radius 1.5 inches.
$x' = \theta(\text{radians}) = x/1.5$ d. Piece rotation of a surface consisting of, or approximating, a series of horizontal right conical sections would be treated similar to (c) above except that the radius would not be constant and would, therefore, be computed, by linear interpolation, between bases of adjacent conical sections. Depth would be similarly adjusted.

e. Use of piece rotation to engrave a portion of the surface of an upright torus where piece rotation will provide only the transverse motion (i.e., along the surface, initially perpendicular to the plane of the torus and therefore traveling around a "small circle" of the torus) requires the conversion shown below. Note that $x'$ is in the above direction and $y'$ is in a direction along a "large circle" of the torus. Further, note that the reference point ($x=0$, $y=0$) is taken as the top center of the torus and the axis of rotation of the workpiece is R2 inches below the reference point.

R2 = minor radius of torus
R1 = major radius of torus (from center of torus to center of circle whose radius is R2)
$\beta = y/(R1 + R2)$
$\gamma = x/R2$
$R3 = R1 + R2 * \cos \gamma$
$y' = R3 * \sin \beta$
$W1 = R2 * \sin \gamma$
$W2 = \sqrt{R3^2 - (y')^2} - R1$
$\delta = \tan^{-1} (W1/W2)$
$x'$ (degrees) $= \delta * 180./\pi$
$A2 = R3 * \sin \beta \cos \delta$
$A1 = R2 (1. -\cos(\delta-\gamma))$
$z' = A1 + A2 + z$ 33. Subroutine CRIT reads a series of data points, stopping only when some significant or "CRITical" feature is detected. The simplest critical feature is the indication of the end of a cut. In many cases, e.g., a spiral of one or more turns, it is not possible to adequately fit the data with a single cubic curve for each axis. Instead, the cut must be divided into two or more cut segments. It has been found convenient, and a reasonably efficient use of output media, to start a new segment when $x$, $y$, $z$, or $\alpha$, pass through a maximum or minimum.

Subroutine CRIT calls subroutine CONV to adjust each data point from flat pattern coordinates to metal surface coordinates as described in (2) above.

34. Two output files are closed; the information for the engraving controller and the information for the plotter.

35. SUBROUTINE PANDSL computes or estimates, in turn for each of the axes X, Y, Z and $\alpha$, values necessary for determining a unique cubic curve as a function of the "string" length, or cut length, U.

$U_n$ = String length $= \Sigma \sqrt{(x_i-x_{i-1})^2+(y_i-y_{i-1})^2}$, $i=2,3 \ldots n$ The remaining equations are shown for the X axis only. The selected set of required values are the point and the slope at each end of the cut segment. The points at each end, $x_1$ and $x_n$, are already known. The slope at each end is determined according to the number of points available and certain other considerations as shown below. Note that the cut segment is arbitrarily assumed to be made up of 100 subsegments or "Steps."

a. If there are less than two points available, an error condition is noted.
b. If there are two points of which the second is the end of the cut (i.e., there is no following cut segment), the slopes are identical.

$dx/du \mid_1 = dx/du \mid_n = (x_2-x_1/U_2) (U_n/100)$ c. If there are two points plus at least one more point representing part of the next cut segment;

$dx/du \mid_1 = U_n/100 [(x_2-x_1/U_2-U_1) -(U_2-U_1/U_3-U_1)(X_3-X_2/U_3-U_2-X_2-X_1/U_2-U_1)]$ $dx/du \mid_n = Un/100 [(x_n-x_{n-1}/U_n-U_{n-1}) (U_{n+1}-U_n) +(x_{n+1}-x_n/U_{n+1}-U_n) U_n-U_{n-1}) ]/U_{n+1} - U_{n-1}$ d. Three points of which the last point is the last point in the cut.
$dx/du \mid_1$ = same as in (c).
$dx/du \mid_n = Un/100[x_n-x_{n-1}/U_n - U_{n-1}+ U_n - U_{n-1}/U_n-U_{n-2} (x_n-x_{n-1}/U_n-U_{n-1} - x_{n-1}-x_{n-2}/U_{n-1}-U_{n-2})]$ e. Three points, plus, at least, one point representing part of the next cut segment, are treated the same as in (c).

f. Four or more points define a full cubic. In this case, a standard least squares fit is made to determine the coefficients of the cubic polynomial $$x = a+bu+cu^2+du^3,$$

except that the polynomial is constrained to pass exactly through the first and last points. The required slopes are then $$dx/du \mid_1 = b+2c +3d$$

$$dx/du \mid_{101} = b+2(100) c+3(100)^2d$$

If the cut segment is not the first cut segment, the initial slope is replaced by the final slope of the previous segment; i.e., $$dx/du \mid_1 = dx/du \mid_n$$

for the previous segment, if, during the call to subroutine CRIT above, the variable was determined to pass through a maximum or minimum, the final slope is set equal to zero.

$$dx/du \mid_n = 0.0$$

36. The normal cubic polynomial coefficients are reconstructed from the two points and the two slopes with exception of the constant coefficient which is not required. For the $x$ axis, for example, where $x = a +bu+cu^2 +du^3$ temporary storage $= x_n -x_1$ $b = dx/du \mid_1$ $d = [100(dx/du \mid_1 + dx/du \mid_n) - 2 \cdot \text{temporary storage}]$ $c = [\text{temporary storage} - 100 \, dx/du \mid_1 - 100^3 d]/100^2$ 37. The tool angle or heading is equal to the direction of motion of the point of the tool projected onto the x-y plane.

$\tan A = dy/dx = dy/du/dx/du = b_y + 2c_y u+3d_y u^2/ b_x + 2c_x u+3d_x u^2$

The above expression is evaluated for $u$ equal to 1, 33, 67, and 100. These four values are then used to determine a cubic polynomial for the tool direction. Prior to carrying out the fitting calculations, the values of A, in degrees, are carefully checked to insure that they are in consecutive quadrants; e.g.,
45°, 20°, 0°, −20° is permitted
355°, 360°, 363°, 370° is permitted 45°, 20°, 360°, 340° is not permitted
355°, 0°, 3°, 10° is not permitted
At the same time, the stored value of the prior tool angle is adjusted by +360° or −360° as necessary to be closest to the tool angle at the start of this cut.

38. The tests for excessive tilt and excessive depth relative to the metal surface are identical except for the limiting values which are commonly specified as ± 25° and +0.008 inch, respectively. The equations for tilt, $\alpha$ are shown.

For a legitimate cubic relationship to exist, $$d_\alpha > 0.0$$

$$c_\alpha{}^2 - 3\, b_\alpha\, d_\alpha \geq 0.0$$

If both these conditions are satisfied, a maximum and/or minimum exists at $$u = -c_\alpha \pm (c_\alpha{}^2 - 3\, b_\alpha\, d_\alpha)/3d_\alpha$$

If $0 \leq u \leq 100$ and if $\alpha_1 + u\,(b_\alpha + u\,(c_\alpha + u d_\alpha))$ > maximum permitted, then the slopes are reduced by 30 percent and control is returned to step 36.

$$d\alpha/du\,|\,_1 = 0.7\ d\alpha/du\,|\,_1$$

$$d\alpha/du\,|\,_{100} = 0.7\ d\alpha/du\,|\,_{100}$$

39. For decorative engraving, it is commonly more important to make aesthetically pleasing cuts than to exactly reproduce a test pattern. For this reason, the tolerance may be specified as ± 0.002 inch or greater. Under these conditions, the following conservative criteria is satisfactory to test for accuracy of reproduction of the test pattern cut. For each data point, compute $u$ $$u_i = v_i/U_n\ 100$$

Compute the coordinates of the reconstructed point.

$$x_{ri} = x_1 + u_i\,(b_x + u_i\,(c_x + u d_x))$$
$$y_{ri} = y_1 + u_i\,(b_y + u_i\,(c_y + u_i d_y))$$

The error is defined as $$\epsilon = \sqrt{(x_{ri} - x_i)^2 + (y_{ri} - y_i)^2}$$

NOTE: If piece rotation is being used, $x$ values must be converted back to flat coordinates.

If the error exceeds the tolerance, reduce the number of data points under consideration by approximately half and control is returned to step 35.

40A. A "tool-up" output block is generated containing the following:
- A pseudo sequence number signifying that this block will contain linear coefficients only. For this purpose −1 times the cut number is used.
- A small value, e.g., one, for the number of steps which together with
- A value for the tool-up motion which will raise the machine head on the order of 0.010 inch (−Z).
- Zero coefficients for all other axes.
- A "sentinel" character, −0.0, signifying the end of the block.

40B. A "move" output block is generated containing the following:
- A pseudo sequence number as in 10A.
- A value of one for the number of steps.
- A linear coefficient for each axis sufficient to move the head of the machine, relative to the work piece, from the end of the previous cut to the start of the new cut, e.g., $$b_x = x_1,\ \text{new cut} - x_n,\ \text{previous cut}$$

Note the coefficients so determined may exceed the range of the output medium. If this happens, the number of steps is increased and the coefficients correspondingly decreased. If the number of steps becomes excessive, more than one output block is produced. (See also 10E below)
- A sentinel value.

40C. A "tool-down" output block is generated which is identical to the tool-up block except for the sign of the Z motion.

40D. Convert from normal polynomial coefficients to difference coefficients. The treatment for all axes is identical. Equations for the x axis are shown.

$$\triangledown 3_x = 6 d_x$$

$$\triangledown 2_x = 2 c_x - 6 d_x$$

$$\triangledown 1_x = b_x - c_x + d_x$$

40E. The magnitude of the number of steps and the difference coefficients are restricted by the format and scaling of these values as stored in the output media; e.g., punched tape. The limitations employed are:

No Steps ≤ 255
$|\triangledown 3|$ < 0.5/motor pulses per unit of travel
$|\triangledown 2|$ < 8.0/motor pulses per unit of travel
$|\triangledown 1|$ < 128/motor pulses per unit of travel If the coefficients are excessive, the number of steps must be increased (from the original basis of 100 steps) and the polynomial coefficients recomputed according to the equations, as shown for the $x$ axis only:

N = revised no. of steps
w = previous no. of steps (e.g., 100)/N
$H_x = x_n - x_1$
$b_x = w b_x$
$d_x = [Nw\,(dx/du\,|\,_1 - dx/du\,|\,_n) - 2H_x]/N^3$
$c_x = [H_x - Nw\,dx/du\,|\,_1 - N^3 d_x]/N^2$ The revised difference coefficients may then be obtained as before.

In addition to the immediate limitations of the output storage media mentioned above, during the computations carried out by the engraving controller, the coefficients must not exceed the limits.

$|\triangledown 3_x'|$ < 128
$|\triangledown 2_x'|$ < 128
$|\triangledown 1_x'|$ < 128 where $x' = x$ * pulses per inch of travel. This is equivalent to the single limitation, $$|\triangledown 1_x'| < 128$$

The first difference coefficient will usually be at a maximum either at the beginning or end of the cut segment. Therefore, two preliminary checks are made to insure:

$|dx/du\,|\,_1|$ < 128/pulses per inch
$|dx/du\,|\,_n|$ < 128/pulses per inch

Furthermore, the combined affect of the second and third difference coefficients are limited so that $|(\triangledown 2_x + N\,\triangledown 3_x) * \text{pulses/inch}|$ < 128.

And the combined effect of all three coefficients must be limited so that if $$AN = -\triangledown 2_x/\triangledown 3_x - 0.5$$

(But if AN < 0, AN is set = 0 and if AN < n, AN is set = n and if $v3_x = 0$, AN is set = 1)

|[ $v1_x$+AN*$v2_x$+0.5*(AN+1)*AN*$v3_x$] * pulses/inch| < 128

40F. The output block which controls motion during the actual cut, if containing full cubic data, will consist of:
- A sequence number equal to the sequential cut number.
- Number of steps to complete the cut segment.
- $v3_x'$, $v2_x'$, $v1_x'$, $v3_y'$, $v2_y'$, etc.
- A sentinel value.

If all the second and third order difference coefficients are zero, or if they become zero when rounded off to the precision of the output media, a "linear" output block is used in place of a full cubic block. To accomplish this, the sequence number is negated and the third and second difference coefficients are omitted.

The computed difference coefficients are replaced by the rounded values in the output.

40G. The arithmetic operation of the engraving controller is simulated, reconstructing points along the cut segment. These points are then plotted using standard plotting subroutines, with the exception that the pattern, if nonflat, must be converted back to a flat pattern, in particular, if piece rotation is employed $$X' = R\theta = x\theta$$

40H. The reconstructed last point of the last cut segment of a cut is saved for use in 10B above. This is a complete and adequate control for round off error for an engraving system whose precision is characterized by the following:
- One pulse ≈ 0.001 inch of travel in x or y.
- Maximum number of steps per cut segment = 255.
- Precision of ≈ $0.001'' * 2^{-17}$ for computations in the engraving controller.

A precision of this order is required even though the precision in the storage media, e.g., punched tape, is only:

$v1$ precision ≈ $0.001 * 2^{-9}$.
$v2$ precision ≈ $0.001 * 2^{-13}$.
$v3$ precision ≈ $0.001 * 2_{+}^{17}$.

PATTERN PLOTTING

Reference is made to FIG. 9 in which the tip of the tool follows the path determined by the $\Sigma\Delta X$, $\Sigma\Delta Y$ for each cut, and is plotted as nominal center lines, shown typically as lines 86. The lines 87 on either side of line 86, represent the intersection of the sides of the tool with the metal surface as depicted in FIG. 3d at points 24. The side lines 87 are spaced from their centerline 86 according to the characteristic $\alpha$ and Z for that particular cut with reference to the following formulas:

$$L_1 = \tan(45° + \alpha) \quad L_2 = Z\tan(45° - \alpha)$$

Where: $\alpha$ is less than 45° and the cutting face of the tool is assumed to be a V with a 90° included angle whose plane is exactly vertical and perpendicular to line 86. Lines 88 are added to give a three-dimensional appearance.

In addition to the several tape saving methods previously mentioned, it should be noted that the major tape saving economies are accomplished as a result of the mathematical approach taken herein. For example, the length of perforated tape for the engraving pattern of FIG. 8 using our mathematical approach is approximately 112 feet, whereas the length of perforated tape using standard ASCII incremental coding with two digit precision is approximately 2,800 feet.

The methods and apparatus disclosed herein are deemed exemplary and are disclosed with the purpose of providing an understanding of the invention and said invention should not be limited strictly to the engraving art and should encompass any obvious modifications which can be made, but should be construed with reference to the appended claims.

We claim:

1. The method of translating into numerical indicia the course of a hand-held engraving tool having a tip making an engraving cut in the face plane of a substantially flat workpiece so that said cut may be automatically simulated by a computer-controlled, powered engraving tool, comprising the steps of:
   a. defining the course of the hand-held tool as a plurality of component motions given as independent variables X, Y, Z, $\alpha$, and a dependent variable $\theta$, where:
   X is the lateral motion of the tool substantially parallel to the face plane of the workpiece;
   Y is the motion of the tool perpendicular to X and substantially parallel to the face plane of the workpeice;
   Z is the depth motion of the tool substantially perpendicular to the face plane of the workpiece;
   $\alpha$ is the tilting motion of the tool about an axis passing through the cutting tip of the tool and substantially parallel to the face plane of the workpiece; and
   $\theta$ is the rotational motion of the tool about an axis passing through the cutting tip of the tool and substantially perpendicular to the face plane of the workpiece, and further wherein $\theta$ is the heading of the tool defined as the angle of the tangent to the tool path at the cutting tip of the tool;
   b. defining each variable as a function of a common parameter: the string length "u" along the cutter point path, thus:

$$X = f_x(u)$$
   $$Y = f_y(u)$$
   $$Z = f_z(u)$$
   $$\theta = f_\theta(u)$$
   $$\alpha = f_\alpha(u);$$

c. expressing each variable as a polynomial in $u$; such as:

$$X = a + bu + cu^2 + du^3 + \ldots$$
   $$Y = e + fu + gu^2 + hu^3 + \ldots$$
   $$Z = i + ju + ju^2 + lu^3 + \ldots$$
   $$\theta = m + nu + pu^2 + qu^3 + \ldots$$
   $$\alpha = r + su + tu^2 + vu^3 + \ldots$$

d. programming a digital computer to derive the coefficients of the polynomial equations of (c);
   e. deriving by means of said digital computer said coefficients and
   f. controlling the course of the powered engraving tool by means of said coefficients to regenerate the course of said hand-held engraving tool making an engraving cut.

2. The method of claim 1, wherein said computer is programmed to process an input containing coded digital information descriptive of a cut in an engraving pattern and provide an output of stored coefficients of a plurality of continuous polynomials descriptive of said cut, comprising the steps of:
   a. providing the input of said computer with data containing the following:
   X points along the engraving cut,
   Y points along the engraving cut,
   Z points along the engraving cut,
   $\alpha$ points along the engraving cut;
   b. computing the string length ($u_n$) along the cut as determined by the X and Y points in accordance with the following formula:

$$u_n = \sum_{1}^{n} \sqrt{\Delta X_i^2 + \Delta Y_i^2}$$

where:

$$\Delta X_1 = X_i - X_{i-1}$$
$$\alpha Y_i = Y_i - Y_{i-1;}$$

c. generating an engraving tool heading $\theta$ at each point ($i$) in accordance with the formula of the type:

$$\theta_i = \text{arc tan } Y_{i+1} - Y_{i-1} / X_{i+1} - X_{i-1} ;$$

d. determining continuous polynomials of common parameter $u$ for each variable: X, Y, Z, $\alpha$, and $\theta$, and the coefficients thereof, such as:

$$X = a + bu + cu^2 + du^3 + \ldots$$
$$Y = e + fu + gu^2\, hu^3 + \ldots$$
$$Z = i + ju + ku^2 + lu^3 + \ldots$$
$$\theta = m + nu + pu^2 + qu^3 + \ldots$$
$$\alpha = r + su + tu^2 + vu^3 + \ldots$$

and then:
   e. storing the coefficients obtained in determining the polynomials of step (d).

3. The method of claim 1, further comprising the step (f) of storing said coefficients.

4. The method of claim 1, further comprising the step (f) of storing said coefficients in a medium consisting of one of the following:
   a perforated tape,
   a magnetic tape,
   a magnetic drum, and punched cards.

5. The method of claim 1, further comprising the steps of:
   f. storing said coefficients; and then
   g. regenerating from said stored coefficients the cutting motions of said powered engraving tool relative to the workpiece.

6. The method of claim 1, wherein said coefficients are difference coefficients.

7. The method of translating into numerical indicia the course of a hand-held engraving tool having a tip making an engraving cut in the substantially cylindrically shaped surface of a workpiece created by a generating element so that said cut may be automatically simulated by a computer-controlled, powered engraving tool, comprising the steps of:
   a. defining the course of the hand-held tool as a plurality of component motions given as independent variables X, $Y_r$, Z, and $\alpha$, and a dependent variable $\theta$,
   where:
   X is the lateral motion of the tool substantially parallel to the generating element of said surface;
   $Y_r$ is the motion of the tool substantially parallel to the plane tangent to the curved surface of the workpiece at the cutting tip of the tool, and substantially perpendicular to the generating element of said surface;
   Z is the depth motion of the tool substantially perpendicular to the plane tangent to the curved surface of the workpiece at the cutting tip of the tool;
   $\alpha$ is the tilting motion of the tool about an axis passing through the cutting tip of the tool and substantially parallel to the plane tangent to the curved surface of the workpiece at the cutting tip of the tool; and
   $\theta$ is the rotational motion of the tool about an axis passing through the cutting tip of the tool and substantially perpendicular to the plane tangent to the curved surface of the workpiece at the cutting tip of the tool and further wherein $\theta$ is the heading of the tool defined as the angle of the tangent to the tool path at the cutting tip of the tool;
   b. defining each variable as a function of a common parameter: the string length "u" along the cutter point path, thus:

$$X = f_x(u)$$
$$Y_r = f_{yr}(u)$$
$$Z = f_z(u)$$
$$\theta = f_\theta(u)$$
$$\alpha = f_\alpha(u);$$

c. expressing each variable as a polynomial in $u$, such as:

$$X = a + bu + cu^2 + du^3 + \ldots$$
$$Y_r = e + fu + gu^2 + hu^3 + \ldots$$
$$Z = i + ju + ku^2 + lu^3 + \ldots$$
$$\theta = m + nu + pu^2 + qu^3 + \ldots$$
$$\alpha = r + su + tu^2 + vu^3 + \ldots$$

d. programming a digital computer to derive the coefficients of the polynomial equations of (c);
   e. deriving by means of said digital computer said coefficients; and
   f. controlling the course of the powered engraving tool by means of said coefficients to regenerate the course of said hand-held engraving tool making an engraving cut.

8. The method of claim 7, wherein said computer is programmed to process an input containing coded digital information descriptive of a cut in an engraving pattern and provide an output of stored coefficients of a plurality of continuous polynomials descriptive of said cut, comprising the steps of:
   a. providing the input of said computer with data containing the following:
   X points along the engraving cut,
   $Y_r$ points along the engraving cut,
   Z points along the engraving cut, α points along the engraving cut;

b. computing the string length ($u_n$) along the cut as determined by the X and $Y_r$ points in accordance with the following formula:

$$u_n = \sum^{n} \sqrt{\Delta X_i^2 + \Delta Y_{r_i}^2}$$

where:

$$\alpha X_i = X_i - X_{i-1}$$
$$\alpha Y_{r_i} = Y_{r_i} - Y_{r_{i-1}};$$

c. generating an engraving tool heading $\theta_i$ at each point ($i$) in accordance with the formula of the type:

$$\theta_i = \text{arc tan } Y_{r_{i+1}} - Y_{r_{i-1}} / X_{i+1} - X_{i+1}$$

d. determining continuous polynomials of common parameter $u$ for each variable: X, $Y_r$, Z, α, and θ, and the coefficients thereof, such as:

$$X = a + bu + cu^2\ du^3 + \ldots$$
$$Y_r = e + fu + gu^2 + hu^3 + \ldots$$
$$Z = i + ju + ku^2 + lu^3 + \ldots$$
$$\theta = m + nu + pu^2 + qu^3 + \ldots$$
$$\alpha = r + su + tu^2 + vu^3 + \ldots$$

and then:

e. storing the coefficients obtained in determining the polynomials of step (d).

9. The method of claim 7, further comprising the step (f) of storing said coefficients.

10. The method of claim 7, further comprising the step (f) of storing said coefficients in a medium consisting of one of the following:
- a perforated tape,
- a magnetic tape,
- a magnetic drum,
- and punched cards.

11. The method of claim 7, further comprising the steps of:

f. storing said coefficients; and then g. regenerating said stored coefficients for directing the cutting motion of said powered engraving tool relative to the workpiece.

12. The method of claim 7, wherein said coefficients are difference coefficients.

13. A method of simulating a preselected hand-engraved pattern in a workpiece by automatic means, comprising the steps of:

a. expressing the preselected hand-engraved pattern in terms of numerical indicia as input into a digital control computer;

b. introducing the numerical indicia to the input of said digital control computer;

c. directing said digital control computer by means of a control program based upon said numerical indicia to control an engraving machine having a power driven reciprocating engraving tool and a plurality of axis motors positioning the movements of the engraving tool operative on a workpiece simulative of the motions of a handheld tool operative on a workpiece wherein a digital computer is programmed to process an input containing coded digital information descriptive of a cut of an engraving pattern made by an engraving tool having a cutting tip making said cut in the face plane of a substantially flat workpiece, and provide an output of coefficients of a plurality of continuous polynomials descriptive of said cut for input into said control computer, comprising the steps of:

a. providing the input of said computer with data containing the following:
- X points along the engraving cut,
- Y points along the engraving cut,
- Z points along the engraving cut,
- α points along the engraving cut, wherein:

X is the lateral motion of the tool substantially parallel to the face plane of the workpiece;

Y is the motion of the tool perpendicular to X and substantially parallel to the face plane of the workpiece;

Z is the depth motion of the tool substantially perpendicular to the face plane of the workpiece; and α is the tilting motion of the tool about an axis passing through the cutting tip of the tool and substantially parallel to the face plane of the workpiece:

b. computing the string length ($u_n$) along the cut as determined by the X and Y points in accordance with the following formula:

$$u_n = \sum^{n} \sqrt{\Delta X_i^2 + \Delta Y_i^2}$$

where:

$$\Delta X_1 = X_i - X_{i-1}$$
$$\Delta Y_i = Y_i - Y_{i-1}$$

c. generating an engraving tool heading $\theta_i$ at each point ($i$) in accordance with the formula of the type:

$$\theta_i = \text{arc tan } Y_{i+1} - Y_{i-1}/X_{i+1} - X_{i-1}$$

where:

θ is the rotational motion of the tool about an axis passing through the cutting tip of the tool and substantially perpendicular to the face plane of the workpiece, and further wherein θ is the heading of the tool defined as the angle of the tangent to the tool path at the cutting tip of the tool;

d. determining continuous polynomials of common parameter $u$ for each variable: X, Y, Z, α, and θ, and the coefficients thereof, such as:

$$X = a + bu + cu^2 + du^3 + \ldots$$
$$Y = e + fu + gu^2 + hu^3 + \ldots$$
$$Z = i + ju + ku^2 + lu^3 + \ldots$$
$$\theta = m + nu + pu^2 + qu^3 + \ldots$$
$$\alpha = r + su + tu^2 + vu^3 + \ldots$$

and then:

e. storing the coefficients obtained in determining the polynomials of step (d).

14. The method of claim 13, wherein said digital control computer is programmed to iteratively process an input containing stored coefficients of a plurality of continuous polynomials descriptive of the engraving cuts in said hand-engraved pattern, to thereby provide an output of control signals directing the motion of a said engraving tool so as to simulate, by successive sequential increments, said engraving cuts, comprising the steps of:
  a. introducing said coefficients into said digital control computer: and then:
  b. generating said control signals from said coefficients by iterative computation.

15. The method of claim 14, wherein said coefficients are difference coefficients, and the iterative computation comprises a series of summations of said difference coefficients to regenerate successive sequential increments of the engraving cuts.

16. The method of claim 13, further comprising the step of storing the numerical indicia prior to its input into said digital control computer.

17. The method of claim 16, wherein said numerical indicia are stored in a medium consisting of one of the following:
  a perforated tape,
  a magnetic tape,
  a magnetic drum, and punched cards.

18. The method of claim 13, wherein said numerical indicia comprise coefficients of a plurality of continuous polynomial functions having a common parameter, said functions being descriptive of the coordinates defining the cutting paths of the engraving tool in simulating said preselected pattern.

19. The method of claim 18, whrein said coefficients are difference coefficients.

20. The method of claim 19, wherein said difference coefficients are summed under the direction of said control program to control the motion of said axis motors.

21. A method of simulating a preselected hand-engraved pattern in a workpiece by automatic means, comprising the steps of:
  a. expressing the preselected hand-engraved pattern in terms of numerical indicia as input into a digital control computer;
  b. introducing the numerical indicia to the input of said digital control computer; and
  c. directing said digital control computer by means of a control program based upon said numerical indicia to control an engraving machine having a power driven reciprocating engraving tool and a plurality of axis motors positioning the movements of the engraving tool operative on a workpiece simulative of the motions of a handheld tool operative on a workpiece wherein a digital computer is programmed to process an input containing coded digital information descriptive of a cut of an engraving pattern made by an engraving tool having a cutting tip making said cut in a substantially cylindrically shaped surface of a workpiece created by a generating element and provide an output of coefficients of a plurality of continuous polynomials descriptive of said cut for input into said control computer, comprising the steps of:
    a. providing the input of said computer with data containing the following:
      X points along the engraving cut,
      $Y_r$ points along the engraving cut,
      Z points along the engraving cut,
      $\alpha$ points along the engraving cut,
    wherein:
      X is the lateral motion of the tool substantially parallel to the generating element of said surface;
      $Y_r$ is the motion of the tool substantially parallel to the plane tangent to the curved surface of the workpiece at the cutting tip of the too, and substantially perpendicular to the generating element of said surface;
      Z is the depth motion of the tool substantially perpendicular to the plane tangent to the curved surface of the workpiece at the cutting tip of the tool;
      $\alpha$ is the tilting motion of the tool about an axis passing through the cutting tip of the tool and substantially parallel to the plane tangent to the curved surface of the workpiece at the cutting tip of the tool;
    b. computing the string length ($u_n$) along the cut as determined by the X and $Y_r$ points in accordance with the following formula:

$$u_n = \sum^n \sqrt{\Delta X_i^2 + \Delta Y_{r_i}^2}$$

where:

$$\Delta X_i = X_i - X_{i-1}$$
$$\Delta Y_{r_i} = Y_{r_i} - Y_{r_{i-1}};$$

c. generating an engraving tool heading $\theta_i$ at each point ($i$) in accordance with the formula of the type:

$$\theta_i = \arc\tan Y_{r_{i+1}} - Y_{r_{i-1}} / X_{i+1} - X_{i-1}$$

where:
      $\theta$ is the rotational motion of the tool about an axis passing through the cutting tip of the tool and substantially perpendicular to the plane tangent to the curved surface of the workpiece at the cutting tip of the tool, and further wherein $\theta$ is the heading of the tool defined as the angle of the tangent to the tool path at the cutting tip of the tool:
    d. determining continuous polynomials of common parameter $u$ for each variable: X, $Y_r$, Z, $\alpha$, and $\theta$, and the coefficients thereof, such as:

$$X = a + bu + cu^2 + du^3 + \ldots$$
$$Y_r = e + fu + gu^2 + hu^3 + \ldots$$
$$Z = i + ju + ku^2 + u\,u^3 + \ldots$$
$$\theta = m + nu + pu^2 + qu^3 + \ldots$$
$$\alpha = r + su + tu^2 + vu^3 + \ldots$$

and then:
    e. storing the coefficients obtained in determining the polynomials of step (d).

22. The method of claim 21, wherein said digital control computer is programmed to iteratively process an input containing stored coefficients of a plurality of continuous polynomials descriptive of the engraving cuts in said hand-engraved pattern, to thereby provide an output of control signals directing the motion of a said engraving tool so as to simulate, by successive sequential increments, said engraving cuts, comprising the steps of:
  a. introducing said coefficients into said digital control computer; and then:
  b. generating said control signals from said coefficients by iterative computation.

23. The method of claim 22, wherein said coefficients are difference coefficients, and the iterative computation comprises a series of summations of said difference coefficients to regenerate successive sequential increments of the engraving cuts.

24. The method of claim 21, further comprising the step of storing the numerical indicia prior to its input into said digital computer.

25. The method of claim 24, wherein said numerical indicia are stored in a medium consisting of one of the following:
- a perforated tape,
- a magnetic tape,
- a magnetic drum, and punched cards.

26. The method of claim 21, wherein said numerical indicia comprise coefficients of a plurality of continuous polynomial functions having a commmon parameter, said functions being descriptive of the coordinates defining the cutting paths of the engraving tool in simulating said preselected pattern.

27. The method of claim 26, wherein said coefficients are difference coefficients.

28. The method of claim 27, wherein said difference coefficients are summed under the direction of said control program to control the motion of said axis motors.

* * * * *

PO-1050
(5/69)

UNITED STATES PATENT OFFICE
CERTIFICATE OF CORRECTION

Patent No. 3,857,025          Dated Dec. 24, 1974

Inventor(s) MYRLE H. ENGLISH, LAURENCE GOODSTAL, WAYNE E. LEEK, ROBERT J. SANZO, ROBERT L. TURNER, CLARK B. WORKMAN, and EDWARD W. YETTER.

It is certified that error appears in the above-identified patent and that said Letters Patent are hereby corrected as shown below:

Col. 1, line 31, after "could", insert --only--.
Col. 2, line 34, delete "a".
Col. 3, line 16, delete "and"; line 59, "type" should be --tape--.
Col. 4, line 11, "a", first occurrence, should be --the--.
Col. 5, line 6, "$Y_{n+1}-Y_{n-1}/X_{n+1}-X_{n-1}$" should be --$(Y_{n+1} - Y_{n-1})/(X_{n+1} - X_{n-1})$--; line 17, "f" should be --$f_\theta$--; line 46, "degree of polynomial" should be --degree polynomial--.
Col. 7, line 52, "2dd" should be --2d--.
Col. 9, line 40, "74" should be --$\theta$--.
Col. 10, line 52, "That" should be --This--; line 57, "FIGS" should be --FIG--.
Col. 11, line 33, "in" should be --is--; line 58, "tend" should be --tends--.
Col. 13, line 14, "Z=+ju" should be --Z=i+ju--; line 64, after "polynomials", insert -- ) --.
Col. 15, lines 8 and 9, "$\nabla^3_{wx}, \nabla^2{}_{wx}, \nabla^1{}_{wx}, \nabla^3{}_{wy}, \nabla^2{}_{wy}$, and $\nabla^1{}_{wy}$" should be --$\nabla^3_{wx}, \nabla^2_{wx}, \nabla^1_{wx}, \nabla^3_{wy}, \nabla^2_{wy}$, and $\nabla^1_{wy}$--; line 12, "$\nabla^3 wi$", two occurrences, should be --$\nabla^3_{wi}$--; line 13, "$\nabla^2{}_{wi}$" should be --$\nabla^2_{wi}$--, two occurrences; line 14, "$\nabla^1{}_{wi}$", two occurrences, should be --$\nabla^1_{wi}$--; line 25, "$\nabla^3{}_{wx}$" should be --$\nabla^3_{wx}$--; line 25, "$\nabla^2{}_{wx}$" should be --$\nabla^2_{wx}$--; line 25, "$\nabla^1{}_{wx}$" should be --$\nabla^1_{wx}$--; line 29, "$\nabla^3{}_{wy}$", should be --$\nabla^3_{wy}$--; line 29, "$\nabla^2{}_{wy}$", should be --$\nabla^2_{wy}$--; line 29, "$\nabla^1{}_{wy}$" should be --$\nabla^1_{wy}$--; line 49, "intergers" should be --integers--;
Col. 16, line 11, "$\nabla^3 z$" should be --$\nabla^3_z$--; line 13, "$\nabla^2 z$" should be --$\nabla^2_z$--; line 26, "$\nabla^2{}_i = \nabla^2{}_i + \nabla^3{}_i$" should be --$\nabla^2_i = \nabla^2_i + \nabla^3_i$--; line 28, "$\nabla^1{}_i = \nabla^1{}_i + \nabla^2{}_i$" should be --$\nabla^1_i = \nabla^1_i + \nabla^2_i$--; line 32,

CERTIFICATE OF CORRECTION - PAGE 2

Patent No. 3,857,025                    Dated   Dec. 24, 1974

Inventors: English et al.

"$\nabla^1{}_i$" should be -- $\nabla^1_i$ --; line 34, "$\nabla^1{}_i$" should be -- $\nabla^1_i$ --; line 38, "$\nabla^2{}_{wi}$", two occurrences, should be -- $\nabla^2_{wi}$ --; line 38, "$\nabla^3{}_{wi}$" should be -- $\nabla^3_{wi}$ --; line 40, "$\nabla^1{}_{wi}$", two occurrences, should be -- $\nabla^1_{wi}$ --; line 40, "$\nabla^2{}_{wi}$" should be -- $\nabla^2_{wi}$ --; line 45, "$\nabla^1{}_i = \nabla^1{}_{wi}$" should be -- $\nabla^1_i = \nabla^1_{wi}$ --;

Col. 17, line 28, after "?", delete "c".
Col. 18, line 44, "32" should start a new paragraph following paragraph 31;
Col. 20, line 1, delete the equation and insert $$-- \left.\frac{dx}{du}\right|_1 = \left.\frac{dx}{du}\right|_n = \frac{x_2 - x_1}{U_2}\left(\frac{U_n}{100}\right) -- ;$$

lines 6 through 10, delete the equations and insert $$-- \left.\frac{dx}{du}\right|_1 = \frac{U_n}{100}\left[\frac{x_2-x_1}{U_2-U_1} - \frac{U_2-U_1}{U_3-U_1}\left(\frac{x_3-x_2}{U_3-U_2} - \frac{x_2-x_1}{U_2-U_1}\right)\right]$$

$$\left.\frac{dx}{du}\right|_n = \frac{U_n}{100}\frac{\left[\left(\frac{x_n-x_{n-1}}{U_n-U_{n-1}}\right)(U_{n+1}-U_n) + \left(\frac{x_{n+1}-x_n}{U_{n+1}-U_n}\right)(U_n-U_{n-1})\right]}{U_{n+1}-U_{n-1}} -- ;$$

lines 13 through 15, delete the equations and insert $$-- \left.\frac{dx}{du}\right|_1 = \text{same as in c}$$

$$\left.\frac{dx}{du}\right|_n = \frac{U_n}{100}\left[\frac{x_n-x_{n-1}}{U_n-U_{n-1}} + \frac{U_n-U_{n-1}}{U_n-U_{n-2}}\left(\frac{x_n-x_{n-1}}{U_n-U_{n-1}} - \frac{x_{n-1}-x_{n-2}}{U_{n-1}-U_{n-2}}\right)\right] -- ;$$

lines 51 and 52, delete the equations and insert $$-- d = \frac{\left[100\left(\left.\frac{dx}{du}\right|_1 + \left.\frac{dx}{du}\right|_n\right) - 2\cdot\text{temporary storage}\right]}{100^3}$$

$$c = \frac{\left[\text{temporary storage} - 100\left.\frac{dx}{du}\right|_1 - 100^3 d\right]}{100^2} -- ;$$

CERTIFICATE OF CORRECTION - PAGE 3

Patent No. 3,857,025                     Dated    Dec. 24, 1974

Inventors: English et al.

lines 58 and 59, delete the equation and insert $$-- \tan A = \frac{dy}{dx} = \frac{\frac{dy}{du}}{\frac{dx}{du}} = \frac{b_y + 2c_y u + 3d_y u^2}{b_x + 2c_x u + 3d_x u^2} --.$$

Col. 21, line 14, delete the equation and insert $$-- c_\alpha^2 - 3 b_\alpha d_\alpha \geq 0.0 --;$$

line 18, delete the equation and insert $$-- u = \frac{-c_\alpha \pm \left(c_\alpha^2 - 3 b_\alpha d_\alpha\right)}{3 d_\alpha} --;$$

line 35, delete the equation and insert $$-- u_i = \frac{U_i}{U_n} 100 --;$$

line 38, "+ud$_x$) )" should be -- +u$_i$d$_x$) )--; line 42, "$^{(}$y$_{ri}$" should be -- (Y$_{ri}$--.

Col. 22, line 20, "$\nabla^3 x$" should be -- $\nabla_x^3$ --; line 22, "$\nabla^2 x$" should be -- $\nabla_x^2$ --; line 23, "$\nabla^1 x$" should be -- $\nabla_x^1$ --; line 49, "$\nabla^3 x'$" should be -- $\nabla_{x'}^3$ --; line 50, "$\nabla^2 x'$" should be -- $\nabla_{x'}^2$ --; line 51, "$\nabla^1 x'$" should be -- $\nabla_{x'}^1$ --; line 55, "$\nabla^1 x'$" should be -- $\nabla_{x'}^1$ --; line 65, delete the equation and insert -- $\left|(\nabla_x^2 + N \nabla_x^3) * \text{pulses/inch}\right| < 128$ --; line 68, delete the equation and insert $$-- AN = \frac{-\nabla_x^2}{\nabla_x^3} - 0.5 --.$$

Col. 23, line 12, delete the equation and insert $$-- \nabla_{x'}^3, \nabla_{x'}^2, \nabla_{x'}^1, \nabla_{y'}^3, \nabla_{y'}^2, \text{etc.} --;$$

line 46, "$2_+^{17}$" should be --$2^{-17}$--; line 59, "L$_2$ = Z tan (45° - α)" should be moved over and down a line to appear under "L$_1$ = &c.".

CERTIFICATE OF CORRECTION - PAGE 4

Patent No. 3,857,025           Dated Dec. 24, 1974

Inventors: English et al.

Col. 25, line 20, "$X_i 2$" should be --$X_i^2$--; line 20, "$Y_i 2$" should be --$Y_i^2$--; line 25, "$\alpha Y_i$" should be --$\triangle Y_i$--; line 30, "$Y_{i+1} - Y_{i-1}/X_{i+1} - X_{i-1}$" should be --$(Y_{i+1} - Y_{i-1})/(X_{i+1} - X_{i-1})$--; line 36, "$gu^2 hu^3$" should be --$gu^2 + hu^3$--.

Col. 26, line 38, "$\theta = f_\theta \ (u)$" should be --$\theta = f_\theta(u)$--; line 39, "$\alpha = f_\alpha \ (u)$" should be --$\alpha = f_\alpha(u)$--.

Col. 27, line 10, "$\alpha X_i$" should be --$\triangle X_i$--, line 11, "$\alpha Y_{r_i}$" should be --$\triangle Y_{r_i}$--; line 16, "$Y_{r_{i+1}} - Y_{r_{i-1}}/X_{i+1} - X_{i+1}$" should be --$(Y_{r_{i+1}} - Y_{r_{i-1}})/(X_{i+1} - X_{i-1})$--; line 21, "$cu^2 du^3$" should be --$cu^2 + du^3$--.

Col. 28, line 38, "$Y_{i+1} - Y_{i-1}/X_{i+1} - X_{i-1}$" should be --$(Y_{i+1} - Y_{i-1})/(X_{i+1} - X_{i-1})$--.

Col. 30, line 3, "too" should be --tool--; line 29, "$Y_{r_{i+1}} - Y_{r_{i-1}}/X_{i+1} - X_{i-1}$" should be --$(Y_{r_{i+1}} - Y_{r_{i-1}})/(X_{i+1} - X_{i-1})$--; line 46, "$\mu u^3$" should be --$lu^3$--.

Signed and sealed this 3rd day of June 1975.

(SEAL)
Attest:

RUTH C. MASON
Attesting Officer

C. MARSHALL DANN
Commissioner of Patents
and Trademarks